(12) United States Patent
Wang et al.

(10) Patent No.: US 11,894,762 B2
(45) Date of Patent: Feb. 6, 2024

(54) DIRECT CURRENT-DIRECT CURRENT CONVERSION CIRCUIT

(71) Applicant: Huawei Digital Power Technologies Co., Ltd., Shenzhen (CN)

(72) Inventors: Jun Wang, Shanghai (CN); Houjian Xu, Shanghai (CN); Tiansan Lin, Shanghai (CN); Fangpo Zhang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 17/670,592

(22) Filed: Feb. 14, 2022

(65) Prior Publication Data

US 2022/0166313 A1    May 26, 2022

Related U.S. Application Data

(63) Continuation of application No. PCT/CN2020/101898, filed on Jul. 14, 2020.

(30) Foreign Application Priority Data

Aug. 15, 2019  (CN) .......................... 201910754932.8

(51) Int. Cl.
    *H02M 3/158*   (2006.01)
    *H02M 1/00*    (2006.01)
    *H02M 3/07*    (2006.01)

(52) U.S. Cl.
    CPC ........ *H02M 1/0095* (2021.05); *H02M 1/0058* (2021.05); *H02M 3/07* (2013.01); *H02M 3/158* (2013.01)

(58) Field of Classification Search
    CPC .. H02M 1/0095; H02M 1/0058; H02M 3/156; H02M 3/158
    See application file for complete search history.

(56) References Cited

U.S. PATENT DOCUMENTS

| 9,419,522 | B1  |   | 8/2016  | Khaligh et al. |                      |
|-----------|-----|---|---------|----------------|----------------------|
| 11,165,345| B2  | * | 11/2021 | Zhuang ..........| H02M 3/158           |
| 11,671,015| B2  | * | 6/2023  | Wang ............| H02M 1/322           |
|           |     |   |         |                | 323/284              |

FOREIGN PATENT DOCUMENTS

CN      2580673 Y     10/2003
CN    204794670 U     11/2015
(Continued)

OTHER PUBLICATIONS

Extended European Search Report issued in EP 20851876.1, dated Aug. 31, 2022, 6 pages.
(Continued)

*Primary Examiner* — Gary L Laxton

(57) ABSTRACT

A direct current-direct current conversion circuit includes: an input inductor, a first capacitor, a second capacitor, a flying capacitor, a first switch, a second switch, a first inductor, a first diode, a first buffer circuit, a third switch, a fourth switch, a second inductor, a second diode, and a second buffer circuit. A power supply, the input inductor, the first diode, the second diode, the first capacitor, and the second capacitor are sequentially connected in series. A first terminal of the flying capacitor is connected between the first diode and the second diode. A second terminal of the flying capacitor is connected between the first switch and the third switch, and the second terminal of the flying capacitor is further connected between the second switch and the second inductor.

16 Claims, 23 Drawing Sheets

(56) References Cited

FOREIGN PATENT DOCUMENTS

| CN | 103095114 B | 3/2016 |
|---|---|---|
| CN | 105471257 A | 4/2016 |
| CN | 105720817 A | 6/2016 |
| CN | 106788215 A | 5/2017 |
| CN | 108258899 A | 7/2018 |
| CN | 105340164 B | 11/2018 |
| CN | 108900078 A | 11/2018 |
| CN | 108923632 A | 11/2018 |
| CN | 109565243 A | 4/2019 |
| CN | 110034681 A | 7/2019 |
| CN | 110649810 A | 1/2020 |
| EP | 2221951 A1 | 8/2010 |
| EP | 2782235 A1 | 9/2014 |
| WO | 2019129027 A1 | 7/2019 |

OTHER PUBLICATIONS

European Patent Office Communication for Application No. 20851876 dated May 9, 2023, 4 pages.
Office Action issued in CN201910754932.8, dated Apr. 24, 2020, 12 pages.
International Search Report and Written Opinion issued in PCT/CN2020/101898, dated Oct. 15, 2020, 10 pages.

\* cited by examiner

DIRECT CURRENT-DIRECT CURRENT CONVERSION CIRCUIT

CROSS-REFERENCE TO RELATED APPLICATIONS

This application is a continuation of International Application No. PCT/CN2020/101898, filed on Jul. 14, 2020, which claims priority to Chinese Patent Application No. 201910754932.8, filed on Aug. 15, 2019. The disclosures of the aforementioned applications are hereby incorporated by reference in their entireties.

TECHNICAL FIELD

The present disclosure relates to the field of photovoltaic power generation technologies, and in particular, to a direct current-direct current conversion circuit.

BACKGROUND

Facing increasingly serious problems of energy shortage and environmental pollution at present, exploitation and utilization of renewable energy and various green energy have become an important measure to realize sustainable development of human devices. Solar energy, as new energy, has become an important object of exploitation and utilization by humans.

At present, utilizing solar energy to generate electricity is an important means to exploit and utilize the solar energy. An existing photovoltaic power generation system includes a photovoltaic module and a direct current converter, where the photovoltaic module is configured to convert solar energy into direct current electrical energy, and the direct current converter is configured to perform direct current conversion on the direct current electrical energy.

Research show that a multi-level power conversion circuit has the following advantages: (1) Medium-high voltage and large-capacity power change can be implemented by using a power device with relatively low voltage capacity; (2) due to an increase in a quantity of levels, an output voltage waveform is of relatively high quality; (3) a change rate of a pulse voltage generated by one switching action is relatively low, so that an electromagnetic interference problem can be greatly alleviated; and (4) same harmonic quality requires a relatively low switching frequency, so that a switching loss can be reduced and power change efficiency can be improved.

Therefore, in actual application, a direct current-direct current converter is usually designed as a multi-level power conversion circuit, so that not only the foregoing advantages can be utilized, but also a power device in the photovoltaic power generation system can be prevented from bearing an entire bus voltage.

However, because grounding capacitance of the photovoltaic module is relatively large, in order not to generate a common mode current, the direct current-direct current conversion circuit can only work at two levels.

SUMMARY

Embodiments of this application provide a direct current-direct current conversion circuit, which can work at three levels when no common mode current is generated.

According to a first aspect, an embodiment of this application provides a direct current-direct current conversion circuit, including: an input inductor, a first capacitor, a second capacitor, a flying capacitor, a first soft switch unit, and a second soft switch unit.

The first soft switch unit includes a first switch, a second switch, a first inductor, a first diode, and a first buffer circuit, and the second soft switch unit includes a third switch, a fourth switch, a second inductor, a second diode, and a second buffer circuit.

The first switch, the second switch, the third switch, and the fourth switch may be a metal-oxide semiconductor field effect transistor or an insulated gate bipolar transistor.

A power supply, the input inductor, the first diode, the second diode, the first capacitor, and the second capacitor are sequentially connected in series, where a first terminal of the input inductor is connected to a positive electrode of the power supply, a second terminal of the input inductor is connected to a positive electrode of the first diode, and a negative electrode of the first diode is connected to a positive electrode of the second diode.

The power supply may be any circuit module that can output a current. When the direct current-direct current conversion circuit is applied to a photovoltaic power generation system, the power supply may be a photovoltaic module.

A first branch and a second branch are connected in parallel between the second terminal of the input inductor and a negative electrode of the power supply, the first branch includes the first switch and the third switch that are sequentially connected in series, the second branch includes the first inductor, the second switch, the second inductor, and the fourth switch that are sequentially connected in series, and the first switch and the first inductor are both connected to the second terminal of the input inductor.

A first terminal of the flying capacitor is connected between the first diode and the second diode, a second terminal of the flying capacitor is connected between the first switch and the third switch, and the second terminal of the flying capacitor is further connected between the second switch and the second inductor.

A first terminal of the first buffer circuit is connected to the positive electrode of the first diode, a second terminal of the first buffer circuit is connected between the first inductor and the second switch, and a third terminal of the first buffer circuit is connected to the negative electrode of the first diode.

A first terminal of the second buffer circuit is connected to the second terminal of the flying capacitor, a second terminal of the second buffer circuit is connected between the second inductor and the fourth switch, and a third terminal of the second buffer circuit is connected between the first capacitor and the second capacitor.

After the second switch is disconnected, the first buffer circuit is configured to transfer energy of the first inductor to the flying capacitor, or to the first capacitor and the second capacitor.

After the fourth switch is disconnected, the second buffer circuit is configured to transfer energy of the second inductor to the second capacitor.

Based on the first aspect, switching states of the first switch and the third switch are controlled to change a working state of the direct current-direct current conversion circuit, so that the direct current-direct current conversion circuit can work at three levels. A structure of the direct current-direct current conversion circuit determines that working state switching of the direct current-direct current conversion circuit does not cause a common mode voltage to change, thereby avoiding generation of a common mode current. In addition, in the first soft switch unit, a reverse recovery process when the first diode is turned off can be effectively inhibited, and in the second soft switch unit, a reverse recovery process when the second diode is turned off can also be effectively inhibited. In this way, losses when the first diode and the second diode are turned off are greatly reduced. Therefore, silicon diodes with a relatively low price can be used as the first diode and the second diode, and silicon carbide diodes with a high price do not need to be used as the first diode and the second diode to reduce losses, so that costs of the direct current-direct current conversion circuit and a product to which the direct current-direct current conversion circuit is applied can be further reduced.

Based on the first aspect, this embodiment further provides a first implementation of the first aspect:

The first buffer circuit includes a third diode, a fourth diode, and a third capacitor, where
- a positive electrode of the third diode is the second terminal of the first buffer circuit, a negative electrode of the third diode is connected to a positive electrode of the fourth diode, and a negative electrode of the fourth diode is the third terminal of the first buffer circuit; and
- a first terminal of the third capacitor is the first terminal of the first buffer circuit, and a second terminal of the third capacitor is connected between the third diode and the fourth diode.

The foregoing first buffer circuit not only can transfer energy of the first inductor, but also can implement zero-voltage turn-off of the first switch.

Based on the first aspect, this embodiment further provides a second implementation of the first aspect:

The second buffer circuit includes a fifth diode, a sixth diode, and a fourth capacitor, where
- a positive electrode of the fifth diode is the second terminal of the second buffer circuit, a negative electrode of the fifth diode is connected to a positive electrode of the sixth diode, and a negative electrode of the sixth diode is the third terminal of the second buffer circuit; and
- a first terminal of the fourth capacitor is the first terminal of the second buffer circuit, and a second terminal of the fourth capacitor is connected between the fifth diode and the sixth diode.

The foregoing second buffer circuit not only can transfer energy of the second inductor, but also can implement zero-voltage turn-off of the second switch.

Based on the first aspect, or the first implementation of the first aspect, or the second implementation of the first aspect, this embodiment further provides a third implementation of the first aspect:

The direct current-direct current conversion circuit further includes a seventh diode, where
- a positive electrode of the seventh diode is connected to the second terminal of the flying capacitor, and a negative electrode of the seventh diode is connected between the first capacitor and the second capacitor.

The seventh diode can limit a voltage of two terminals of the third switch to below a voltage of two terminals of the second capacitor, so that the third switch has no risk of overvoltage. In addition, in a specific scenario, the second diode can be further prevented from being broken down in a circuit power-on process.

Based on the first aspect, or the first implementation of the first aspect, or the second implementation of the first aspect, or the third implementation of the first aspect, this embodiment further provides a fourth implementation of the first aspect:

The direct current-direct current conversion circuit further includes a capacitance balance circuit, where a first terminal of the capacitance balance circuit is connected to a negative electrode of the second diode, a second terminal of the capacitance balance circuit is connected between the first capacitor and the second capacitor, and a third terminal of the capacitance balance circuit is connected to the negative electrode of the power supply; and
the capacitance balance circuit is configured to balance voltages of the first capacitor and the second capacitor.

The capacitance balance circuit can balance voltages of the first capacitor and the second capacitor, to avoid a case in which the voltages of the first capacitor and the second capacitor are different in a long-term working process of the direct current-direct current conversion circuit.

Based on the first aspect, or the first implementation of the first aspect, or the second implementation of the first aspect, or the third implementation of the first aspect, this embodiment further provides a fifth implementation of the first aspect:

The direct current-direct current conversion circuit further includes an inverter, where
- a positive input terminal of the inverter is connected to a negative electrode of the second diode, a bus capacitance midpoint of the inverter is connected to a connection point between the first capacitor and the second capacitor, and a negative input terminal of the inverter is connected to the negative electrode of the power supply.

In a working process, the inverter can serve the same purpose as the capacitance balance circuit, that is, can balance voltages of the first capacitor and the second capacitor, to avoid a case in which the voltages of the first capacitor and the second capacitor are different in a long-term working process of the direct current-direct current conversion circuit.

Based on the fifth implementation of the first aspect, this embodiment further provides a sixth implementation of the first aspect:

The capacitance balance circuit includes a third branch, a fourth branch, and a fifth branch, where
- the third branch includes a ninth diode, an eighth diode, a sixth switch, and a fifth switch that are sequentially connected in series, where a negative electrode of the ninth diode is connected to the negative electrode of the second diode, a positive electrode of the ninth diode is connected to a negative electrode of the eighth diode, a first terminal of the fifth switch is connected to the sixth switch, and a second terminal of the fifth switch is connected to the negative electrode of the power supply;
- a first terminal of the fourth branch is connected between the first capacitor and the second capacitor, and a second terminal of the fourth branch is connected between the eighth diode and the sixth switch;
- a first terminal of the fifth branch is connected between the eighth diode and the ninth diode, and a second terminal of the fifth branch is connected between the sixth switch and the fifth switch;
- a fifth capacitor is connected in series in the fifth branch; and
- a third inductor is connected in series in the fifth branch or the third inductor is connected in series in the fourth branch.

In this implementation, a feasible solution of the capacitance balance circuit is provided. By controlling the fifth switch and the sixth switch, a function of balancing voltages of the first capacitor and the second capacitor can be implemented, and the balancing process may be periodic.

Based on the fifth implementation of the first aspect, this embodiment further provides a seventh implementation of the first aspect:

The capacitance balance circuit includes a sixth branch, a seventh branch, and an eighth branch, where
  the sixth branch includes a tenth switch, a ninth switch, an eighth switch, and a seventh switch that are sequentially connected in series, where a first terminal of the tenth switch is connected to the negative electrode of the second diode, a second terminal of the tenth switch is connected to the ninth switch, a first terminal of the seventh switch is connected to the eighth switch, and a second terminal of the seventh switch is connected to the negative electrode of the power supply;
  a first terminal of the seventh branch is connected between the first capacitor and the second capacitor, and a second terminal of the seventh branch is connected between the eighth switch and the ninth switch;
  a first terminal of the eighth branch is connected between the ninth switch and the tenth switch, and a second terminal of the eighth branch is connected between the seventh switch and the eighth switch;
  a sixth capacitor is connected in series in the eighth branch; and
  a fourth inductor is further connected in series in the eighth branch or the fourth inductor is connected in series in the fourth branch.

In this implementation, a feasible solution of the capacitance balance circuit is provided. By controlling the tenth switch, the ninth switch, the eighth switch, and the seventh switch, a function of balancing voltages of the first capacitor and the second capacitor can be implemented, and the balancing process may be periodic.

According to a second aspect, an embodiment of this application provides a direct current-direct current conversion circuit, including: an input inductor, a first capacitor, a second capacitor, a flying capacitor, a first soft switch unit, and a second soft switch unit.

The first soft switch unit includes a first switch, a first inductor, a first diode, and a first buffer circuit, and the second soft switch unit includes a second switch, a second inductor, a second diode, and a second buffer circuit.

The first switch, the second switch, the third switch, and the fourth switch may be a metal-oxide semiconductor field effect transistor or an insulated gate bipolar transistor.

A power supply, the input inductor, the first diode, the second diode, the first capacitor, and the second capacitor are sequentially connected in series, where a first terminal of the input inductor is connected to a positive electrode of the power supply, a second terminal of the input inductor is connected to a positive electrode of the first diode, and a negative electrode of the first diode is connected to a positive electrode of the second diode.

The power supply may be any circuit module that can output a current. When the direct current-direct current conversion circuit is applied to a photovoltaic power generation system, the power supply may be a photovoltaic module.

A first branch is connected in parallel between the second terminal of the input inductor and a negative electrode of the power supply, the first branch includes the first inductor, the first switch, the second inductor, and the second switch that are sequentially connected in series, and the first inductor is connected to the second terminal of the input inductor.

A first terminal of the flying capacitor is connected between the first diode and the second diode, and a second terminal of the flying capacitor is connected between the first switch and the second inductor.

A first terminal of the first buffer circuit is connected to the positive electrode of the first diode, a second terminal of the first buffer circuit is connected between the first inductor and the first switch, a third terminal of the first buffer circuit is connected to the negative electrode of the first diode, and a fourth terminal of the first buffer circuit is connected to the second terminal of the flying capacitor.

When the first switch is in a disconnected state, the first buffer circuit is configured to transfer energy of the first inductor to the first capacitor and the second capacitor.

A first terminal of the second buffer circuit is connected to the second terminal of the flying capacitor, a second terminal of the second buffer circuit is connected between the second inductor and the second switch, a third terminal of the second buffer circuit is connected between the first capacitor and the second capacitor, and a fourth terminal of the second buffer circuit is connected to the negative electrode of the power supply.

When the second switch is in a disconnected state, the second buffer circuit is configured to transfer energy of the second inductor to the second capacitor.

Based on the first aspect, switching states of the first switch and the second switch are controlled to change a working state of the direct current-direct current conversion circuit, so that the direct current-direct current conversion circuit can work at three levels. A structure of the direct current-direct current conversion circuit determines that working state switching of the direct current-direct current conversion circuit does not cause a common mode voltage to change, thereby avoiding generation of a common mode current. In addition, in the first soft switch unit, a reverse recovery process when the first diode is turned off can be effectively inhibited, and in the second soft switch unit, a reverse recovery process when the second diode is turned off can also be effectively inhibited. In this way, losses when the first diode and the second diode are turned off are greatly reduced. Therefore, silicon diodes with a relatively low price can be used as the first diode and the second diode, and silicon carbide diodes with a high price do not need to be used as the first diode and the second diode to reduce losses, so that costs of the direct current-direct current conversion circuit and a product to which the direct current-direct current conversion circuit is applied can be further reduced.

Based on the first aspect, this embodiment further provides a first implementation of the first aspect:

The first buffer circuit includes a third diode, a fourth diode, a fifth diode, a third capacitor, and a fourth capacitor, where
  a positive electrode of the third diode is the second terminal of the first buffer circuit, and a negative electrode of the third diode is connected to a positive electrode of the fourth diode;
  a negative electrode of the fourth diode is connected to a positive electrode of the fifth diode, and a negative electrode of the fifth diode is the third terminal of the first buffer circuit;
  a first terminal of the third capacitor is the first terminal of the first buffer circuit, and a second terminal of the third capacitor is connected between the fourth diode and the fifth diode; and
  a first terminal of the fourth capacitor is connected between the third diode and the fourth diode, and a second terminal of the fourth capacitor is the fourth terminal of the first buffer circuit.

The foregoing first buffer circuit not only can transfer energy of the first inductor, but also can implement zero-voltage turn-off of the first switch.

Based on the first aspect, this embodiment further provides a second implementation of the first aspect:

The second buffer circuit includes a sixth diode, an eighth diode, a ninth diode, a fifth capacitor, and a sixth capacitor, where a positive electrode of the sixth diode is the second terminal of the second buffer circuit, and a negative electrode of the sixth diode is connected to a positive electrode of the eighth diode;

a negative electrode of the eighth diode is connected to a positive electrode of the ninth diode, and a negative electrode of the ninth diode is the third terminal of the second buffer circuit;

a first terminal of the fifth capacitor is the first terminal of the second buffer circuit, and a second terminal of the fifth capacitor is connected between the eighth diode and the ninth diode; and a first terminal of the sixth capacitor is connected between the sixth diode and the eighth diode, and a second terminal of the sixth capacitor is the fourth terminal of the second buffer circuit.

The foregoing second buffer circuit not only can transfer energy of the second inductor, but also can implement zero-voltage turn-off of the second switch.

Based on the first aspect, or the first implementation of the first aspect, or the second implementation of the first aspect, this embodiment further provides a third implementation of the first aspect:

The direct current-direct current conversion circuit further includes a seventh diode, where a positive electrode of the seventh diode is connected to the second terminal of the flying capacitor, and a negative electrode of the seventh diode is connected between the first capacitor and the second capacitor.

The seventh diode can limit a voltage of two terminals of the third switch to below a voltage of two terminals of the second capacitor, so that the third switch has no risk of overvoltage. In addition, in a specific scenario, the second diode can be further prevented from being broken down in a circuit power-on process.

Based on the first aspect, or the first implementation of the first aspect, or the second implementation of the first aspect, or the third implementation of the first aspect, this embodiment further provides a fourth implementation of the first aspect:

The direct current-direct current conversion circuit further includes a capacitance balance circuit, where a first terminal of the capacitance balance circuit is connected to a negative electrode of the second diode, a second terminal of the capacitance balance circuit is connected between the first capacitor and the second capacitor, and a third terminal of the capacitance balance circuit is connected to the negative electrode of the power supply.

The capacitance balance circuit can balance voltages of the first capacitor and the second capacitor, to avoid a case in which the voltages of the first capacitor and the second capacitor are different in a long-term working process of the direct current-direct current conversion circuit.

Based on the first aspect, or the first implementation of the first aspect, or the second implementation of the first aspect, or the third implementation of the first aspect, this embodiment further provides a fifth implementation of the first aspect:

The direct current-direct current conversion circuit further includes an inverter, where a positive input terminal of the inverter is connected to a negative electrode of the second diode, a bus capacitance midpoint of the inverter is connected to a connection point between the first capacitor and the second capacitor, and a negative input terminal of the inverter is connected to the negative electrode of the power supply.

In a working process, the inverter can serve the same purpose as the capacitance balance circuit, that is, can balance voltages of the first capacitor and the second capacitor, to avoid a case in which the voltages of the first capacitor and the second capacitor are different in a long-term working process of the direct current-direct current conversion circuit.

Based on the fifth implementation of the first aspect, this embodiment further provides a sixth implementation of the first aspect:

The capacitance balance circuit includes a second branch, a third branch, and a fourth branch, where the second branch includes an eleventh diode, a tenth diode, a fourth switch, and a third switch that are sequentially connected in series, where a negative electrode of the eleventh diode is connected to the negative electrode of the second diode, a positive electrode of the eleventh diode is connected to a positive electrode of the tenth diode, a first terminal of the third switch is connected to the fourth switch, and a second terminal of the third switch is connected to the negative electrode of the power supply;

a first terminal of the third branch is connected between the first capacitor and the second capacitor, and a second terminal of the third branch is connected between the tenth diode and the fourth switch;

a first terminal of the fourth branch is connected between the tenth diode and the eleventh diode, and a second terminal of the fourth branch is connected between the fourth switch and the third switch;

a seventh capacitor is connected in series in the fourth branch; and a third inductor is connected in series in the fourth branch or the third inductor is connected in series in the third branch.

In this implementation, a feasible solution of the capacitance balance circuit is provided. By controlling the fourth switch and the third switch, a function of balancing voltages of the first capacitor and the second capacitor can be implemented, and the balancing process may be periodic.

Based on the fifth implementation of the first aspect, this embodiment further provides a seventh implementation of the first aspect:

The capacitance balance circuit includes a fifth branch, a sixth branch, and a seventh branch, where the fifth branch includes an eighth switch, a seventh switch, a sixth switch, and a fifth switch that are sequentially connected in series, where a first terminal of the eighth switch is connected to the negative electrode of the second diode, a second terminal of the eighth switch is connected to the seventh switch, a first terminal of the fifth switch is connected to the sixth switch, and a second terminal of the fifth switch is connected to the negative electrode of the power supply;

a first terminal of the sixth branch is connected between the first capacitor and the second capacitor, and a second terminal of the sixth branch is connected between the sixth switch and the seventh switch;

a first terminal of the seventh branch is connected between the seventh switch and the eighth switch, and a second terminal of the seventh branch is connected between the fifth switch and the sixth switch;

an eighth capacitor is connected in series in the seventh branch; and a fourth inductor is further connected in series in the seventh branch or the fourth inductor is connected in series in the third branch.

In this implementation, a feasible solution of the capacitance balance circuit is provided. By controlling the eighth switch, the seventh switch, the sixth switch, and the fifth switch, a function of balancing voltages of the first capacitor and the second capacitor can be implemented, and the balancing process may be periodic.

It can be learned from the foregoing technical solutions that the embodiments of this application have the following advantages:

The negative electrode of the power supply is directly connected to the second capacitor by using a wire, and regardless of a change of the working state of the direct current-direct current conversion circuit, voltages of all positions between the negative electrode of the power supply and the second capacitor remain unchanged. To be specific, a common mode voltage remains unchanged. Therefore, no common mode current is generated. In a working period, states of the first switch and the third switch may be changed to make the direct current-direct current conversion circuit work in three different working states, and therefore the direct current-direct current conversion circuit can work at three levels. In addition, in a turn-on process of the second switch, due to an effect of the first inductor, a current of the first diode slowly decreases, to implement zero-current turn-off of the first diode. Similarly, in a turn-on process of the fourth switch, due to an effect of the second inductor, a current of the second diode slowly decreases, to implement zero-current turn-off of the second diode. Therefore, in the direct current-direct current conversion circuit in the embodiments of this application, losses when the first diode and the second diode are turned off are relatively small. In this way, silicon diodes may be used as the first diode and the second diode, and silicon carbide diodes with a high price do not need to be used as the first diode and the second diode to reduce losses, so that costs of the direct current-direct current conversion circuit can be reduced, and costs of a product to which the direct current-direct current conversion circuit is applied can be further reduced.

DESCRIPTION OF EMBODIMENTS

Embodiments of this application provide a direct current-direct current conversion circuit, which can work at three levels when no common mode current is generated.

Figure 1:
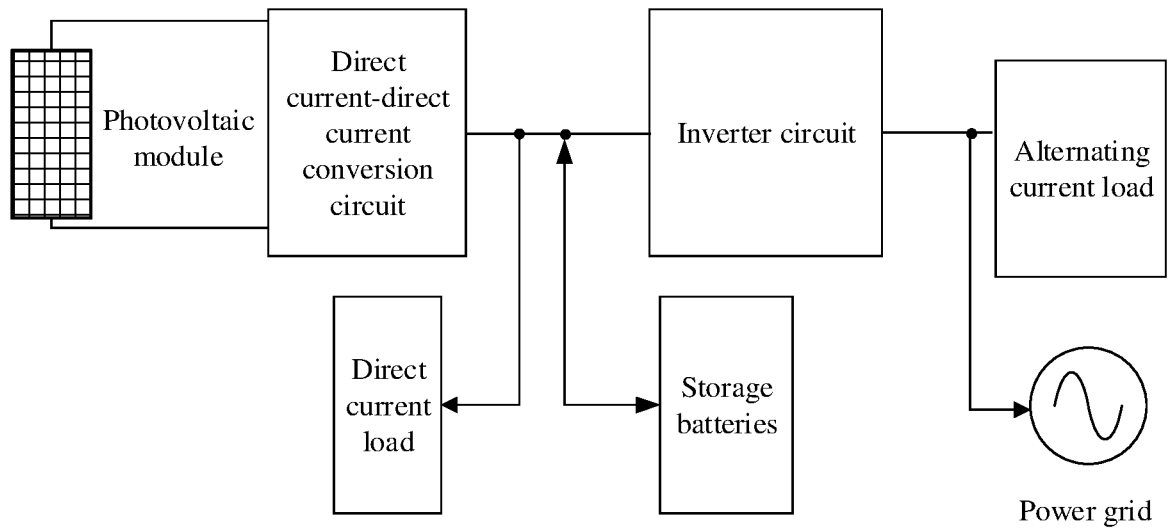
FIG. 1 is a schematic architectural diagram of a photovoltaic power generation system according to an embodiment of this application.

It should be understood that the direct current-direct current conversion circuit in the embodiments of this application may be applied to any direct current conversion scenario, and specifically, may be applied to a photovoltaic power generation system. FIG. 1 is a schematic architectural diagram of a photovoltaic power generation system according to an embodiment of this application. As shown in FIG. 1, the photovoltaic power generation system includes a photovoltaic module, a direct current-direct current conversion circuit, storage batteries, an inverter circuit, a direct current load, an alternating current load, and a power grid.

In the photovoltaic power generation system, solar energy is converted into direct current electrical energy by the photovoltaic module, the direct current electrical energy is boosted by a direct current-direct current converter, the boosted direct current electrical energy may be directly supplied to the direct current load and stored into the storage batteries, or may continue to be converted into alternating current electrical energy by an inverter. The alternating current electrical energy may be supplied directly to the alternating current load or connected to the power grid.

The direct current-direct current conversion circuit in the embodiments of this application is applied to the photovoltaic power generation system, so that no common mode current is generated, and the direct current-direct current conversion circuit can work at three levels. To better understand a process of working by using three levels, a simple example is first used to describe the process of working by using three levels.

Figure 2:
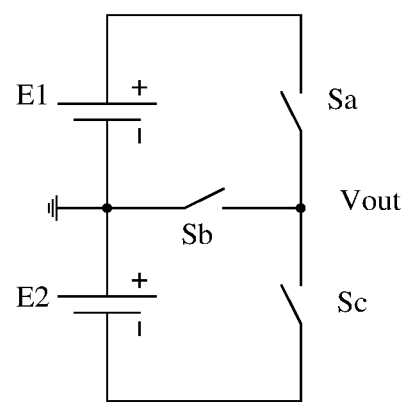
FIG. 2 is a schematic diagram of a structure of a non-limiting, exemplary three-level circuit.

FIG. 2 is a schematic diagram of a structure of a non-limiting exemplary three-level conversion circuit. In the circuit shown in FIG. 2, E1 and E2 are two direct current power supplies, a negative electrode of the direct current power supply E1 is connected to a positive electrode of the direct current power supply E2, and the connection point is grounded, that is, a reference voltage of the connection point is 0. A switch Sa and a switch Sc are connected in series between a positive electrode of the direct current power supply E1 and a negative electrode of the direct current power supply E2, one terminal of a switch Sb is connected between the negative electrode of the direct current power supply E1 and the positive electrode of the direct current power supply E2, and the other terminal is connected between the switch Sa and the switch Sc. In a working process, if states of the switches Sa, Sb, and Sc are different, output voltages Vout are different.

Specifically, if Sa is closed, and Sb and Sc are disconnected, the output voltage Vout is E1. If Sb is closed, and Sa and Sc are disconnected, the output voltage Vout is 0. If Sc is closed, and Sa and Sb are disconnected, the output voltage Vout is −E2. It can be learned that the circuit shown in FIG. 2 may output three levels: E1, 0, and −E2.

Based on the foregoing example, the process in which the circuit works at three levels may be preliminarily understood. The following describes in detail the process in which the direct current-direct current conversion circuit in the embodiments of this application works at three levels.

First, it should be noted that the direct current-direct current conversion circuit in the embodiments of this application is formed by newly adding a component to a flying capacitor based boost chopper circuit. When the newly added component includes a switching component, the direct current-direct current conversion circuit is also referred to as an active direct current-direct current conversion circuit. When the newly added component does not include a switching component, the direct current-direct current conversion circuit is also referred to as a passive direct current-direct current conversion circuit. Therefore, the active direct current-direct current conversion circuit and the passive direct current-direct current conversion circuit are separately described below. Herein, the active direct current-direct current conversion circuit is first described.

Figure 3:
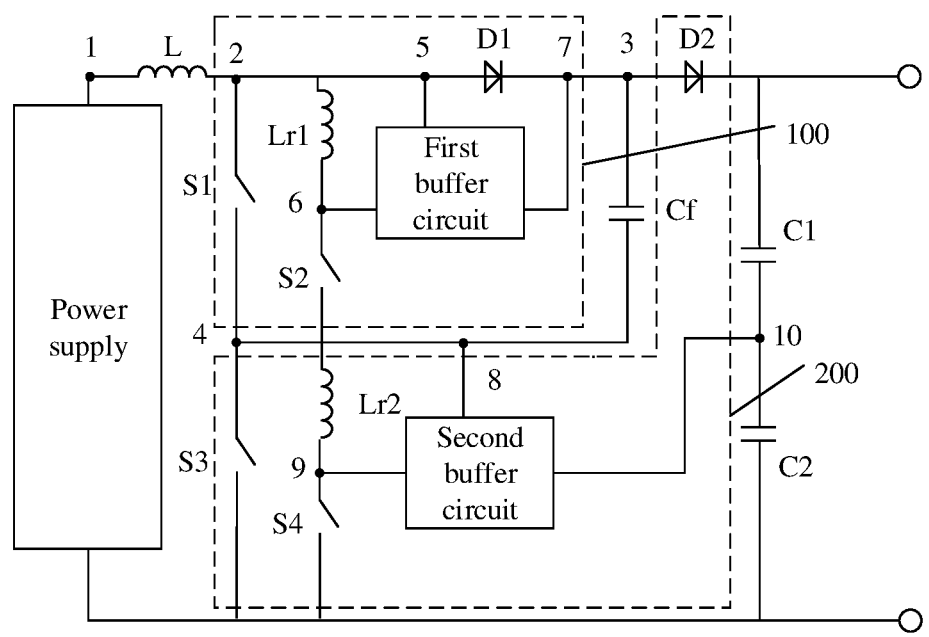
FIG. 3 is a schematic diagram of a first embodiment of a direct current-direct current conversion circuit according to an embodiment of this application.

FIG. 3 is a schematic diagram of a first embodiment of a direct current-direct current conversion circuit according to an embodiment of this application. The first embodiment of the direct current-direct current conversion circuit includes: an input inductor L, a first capacitor C1, a second capacitor C2, a flying capacitor Cf, a first soft switch unit 100, and a second soft switch unit 200.

The first soft switch unit 100 includes a first switch S1, a second switch S2, a first inductor Lr1, a first diode D1, and a first buffer circuit; and the second soft switch unit 200 includes a third switch S3, a fourth switch S4, a second inductor Lr2, a second diode D2, and a second buffer circuit.

The first switch S1, the second switch S2, the third switch S3, and the fourth switch S4 may be a metal-oxide semiconductor field effect transistor or an insulated gate bipolar transistor.

A power supply, the input inductor L, the first diode D1, the second diode D2, the first capacitor C1, and the second capacitor C2 are sequentially connected in series, where a first terminal 1 of the input inductor L is connected to a positive electrode of the power supply, a second terminal 2 of the input inductor L is connected to a positive electrode of the first diode D1, and a negative electrode of the first diode D1 is connected to a positive electrode of the second diode D2.

It may be understood that, the power supply may be any circuit module that can output a current. When the direct current-direct current conversion circuit is applied to a photovoltaic power generation system, the power supply may be a photovoltaic module.

A first branch and a second branch are connected in parallel between the second terminal 2 of the input inductor L and a negative electrode of the power supply, the first branch includes the first switch S1 and the third switch S3 that are sequentially connected in series, the second branch includes the first inductor Lr1, the second switch S2, the second inductor Lr2, and the fourth switch S4 that are sequentially connected in series, and the first switch S1 and the first inductor Lr1 are both connected to the second terminal 2 of the input inductor L.

It can be seen from FIG. 3 that, the first inductor Lr1 is connected in series to the second switch S2, and the first inductor Lr1 and the second switch S2 are connected, as a whole, in parallel to two terminals of the first switch S1. Similarly, the second inductor Lr2 is connected in series to the fourth switch S4, and the second inductor Lr2 and the fourth switch S4 are connected, as a whole, in parallel to two terminals of the third switch S3.

A first terminal 3 of the flying capacitor Cf is connected between the first diode D1 and the second diode D2, a second terminal 4 of the flying capacitor Cf is connected between the first switch S1 and the third switch S3, and the second terminal 4 of the flying capacitor Cf is further connected between the second switch S2 and the second inductor Lr2.

A first terminal 5 of the first buffer circuit is connected to the positive electrode of the first diode D1, a second terminal 6 of the first buffer circuit is connected between the first inductor Lr1 and the second switch S2, and a third terminal 7 of the first buffer circuit is connected to the negative electrode of the first diode D1.

After the second switch S2 is disconnected, the first buffer circuit is configured to transfer energy of the first inductor Lr1 to the flying capacitor Cf, or to the first capacitor C1 and the second capacitor C2.

A first terminal 8 of the second buffer circuit is connected to the second terminal 4 of the flying capacitor Cf, a second terminal 9 of the second buffer circuit is connected between the second inductor Lr2 and the fourth switch S4, and a third terminal 10 of the second buffer circuit is connected between the first capacitor C1 and the second capacitor C2.

After the fourth switch S4 is disconnected, the second buffer circuit is configured to transfer energy of the second inductor Lr2 to the second capacitor C2.

The following analyzes working states of the direct current-direct current conversion circuit in this embodiment based on the foregoing circuit structure. Herein, it is first assumed that the input inductor L, the first capacitor C1, the second capacitor C2, and the flying capacitor Cf are all sufficiently large, to ensure that in a working process of the direct current-direct current conversion circuit, a voltage Vf of two terminals of the flying capacitor Cf and output voltages Vout of two terminals of the first capacitor C1 and of two terminals of the second capacitor C2 remain basically unchanged.

Figure 4:
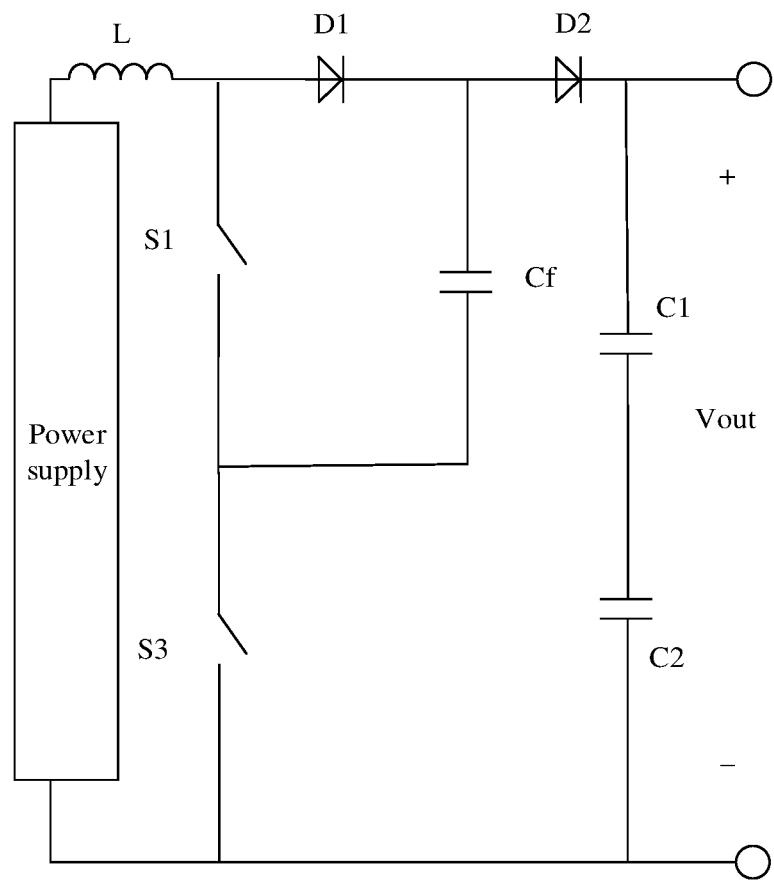
FIG. 4 is a schematic diagram of a first embodiment of a flying capacitor based boost chopper circuit.

It may be understood that, the input inductor L, the first switch S1, the third switch S3, the first diode D1, the second diode D2, the flying capacitor Cf, the first capacitor C1, and the second capacitor C2 constitute the flying capacitor Cf based boost chopper circuit shown in FIG. 4. It can be learned based on a working principle of the flying capacitor Cf based boost chopper circuit that, when the circuit shown in FIG. 4 works normally, an output voltage Vout is greater than a power supply voltage Vin, and voltages of the first capacitor C1 and the second capacitor C2 always remain the same. In addition, switching states of the first switch S1 and the third switch S3 are changed by using a control signal, so that the direct current-direct current conversion circuit in this embodiment can work in the following four working states.

Figure 5:
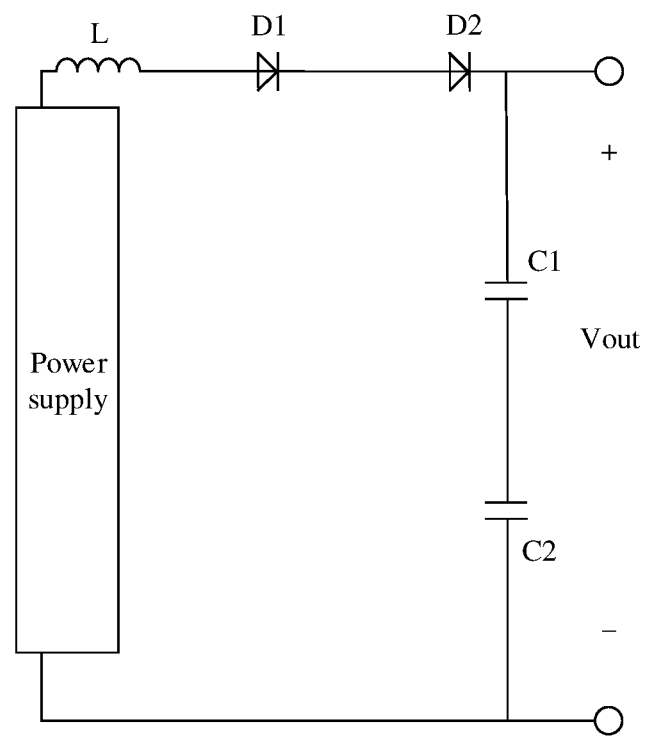
FIG. 5 is a schematic diagram of a first embodiment of a current path when a direct current-direct current conversion circuit is in a first working state.

FIG. 5 is a schematic diagram of a first embodiment of a current path when a direct current-direct current conversion circuit is in a first working state. When the direct current-direct current conversion circuit is in the first working state, the first switch S1 and the third switch S3 are in a disconnected state, and a current flows out from the positive electrode of the power supply, and sequentially flows through the input inductor L, the first diode D1, the second diode D2, the first capacitor C1, and the second capacitor C2 into the negative electrode of the power supply, and the input inductor L charges the first capacitor C1 and the second capacitor C2. A voltage of a connection point between the input inductor L and the first switch S1 is Vout.

Figure 6:
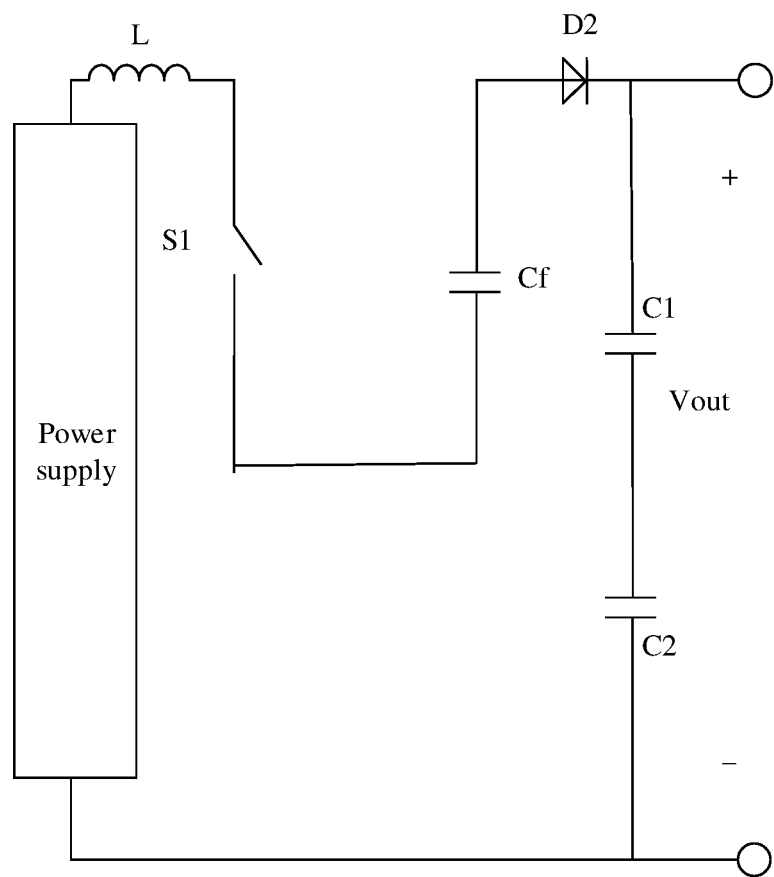
FIG. 6 is a schematic diagram of a second embodiment of a current path when a direct current-direct current conversion circuit is in a second working state.

FIG. 6 is a schematic diagram of a second embodiment of a current path when a direct current-direct current conversion circuit is in a second working state. When the direct current-direct current conversion circuit is in the second working state, the first switch S1 is in a closed state, and the third switch S3 is in a disconnected state. A current flows out from the positive electrode of the power supply, and sequentially flows through the input inductor L, the first switch S1, the flying capacitor Cf, the second diode D2, the first capacitor C1, and the second capacitor C2 into the negative electrode of the power supply, and the input inductor L and the flying capacitor Cf jointly charge the first capacitor C1 and the second capacitor C2. A voltage of a connection point between the input inductor L and the first switch S1 is Vout−Vf.

Figure 7:
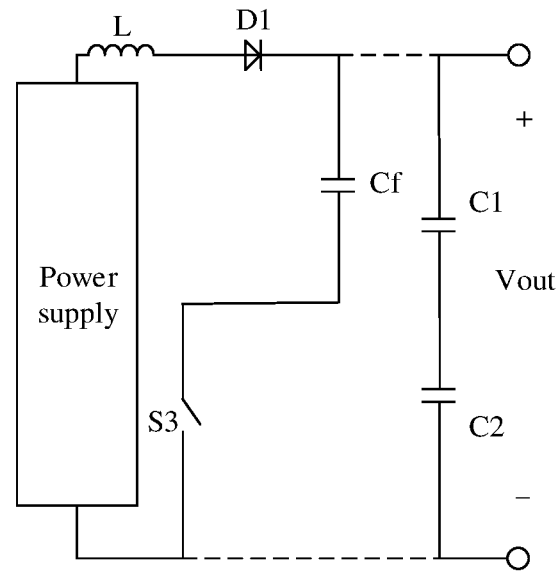
FIG. 7 is a schematic diagram of a third embodiment of a current path when a direct current-direct current conversion circuit is in a third working state.

FIG. 7 is a schematic diagram of a third embodiment of a current path when a direct current-direct current conversion circuit is in a third working state. When the direct current-direct current conversion circuit is in the third working state, the third switch S3 is in a closed state, and the first switch S1 is in a disconnected state. A current flows out from the positive electrode of the power supply, and sequentially flows through the input inductor L, the first diode D1, the flying capacitor Cf, and the third switch S3 into the negative electrode of the power supply, and the power supply charges the input inductor L and the flying capacitor Cf. A voltage of a connection point between the input inductor L and the first switch S1 is Vf.

Figure 8:
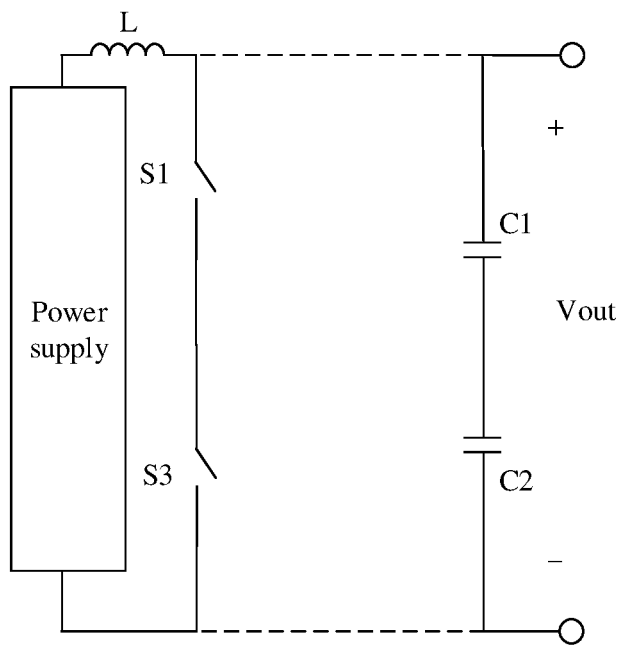
FIG. 8 is a schematic diagram of a fourth embodiment of a current path when a direct current-direct current conversion circuit is in a fourth working state.

FIG. 8 is a schematic diagram of a fourth embodiment of a current path when a direct current-direct current conversion circuit is in a fourth working state. When the direct current-direct current conversion circuit is in the fourth working state, the first switch S1 and the third switch S3 are in a closed state, and a current flows out from the positive electrode of the power supply, and sequentially flows through the first switch S1 and the third switch S3 into the negative electrode of the power supply, and the power supply charges the input inductor L. A voltage of a connection point between the input inductor L and the first switch S1 is 0.

When a duty cycle D of the control signal is equal or greater than 0.5, in a working period, the direct current-direct current conversion circuit works sequentially in the second working state, the fourth working state, and the third working state, to implement three-level output. When the duty cycle D of the control signal is less than 0.5, in a working period, the direct current-direct current conversion circuit works sequentially in the second working state, the first working state, and the third working state, to implement three-level output. In addition, because the negative electrode of the power supply is directly connected to the second capacitor C2 by using a wire, regardless of a change of the working state of the direct current-direct current conversion circuit, a voltage of any position between the negative electrode of the power supply and the second capacitor C2 does not change. To be specific, a common mode voltage does not change. Therefore, no common mode current is generated.

It should be understood that, with switching of working states of the first switch S1 and the third switch S3, working states of the first diode D1 and the second diode D2 also constantly switch between turn-on and turn-off. A reverse recovery process exists in both cases in which the first diode D1 is turned off and the second diode D2 is turned off. An additional loss is generated in the reverse recovery process, and the loss gradually increases with an increase of switching frequency. Therefore, based on the circuit shown in FIG. 4, in this embodiment, the first inductor Lr1, the second switch S2, and the first buffer circuit are added to form the first soft switch unit 100 together with the first diode D1 and the first switch S1. The reverse recovery process when the first diode D1 is turned off is inhibited by controlling closing time of the first switch S1 and the second switch S2. In addition, the second inductor Lr2, the fourth switch S4, and the second buffer circuit are added to form the second soft switch unit 200 together with the second switch S2 and the second diode D2. The reverse recovery process when the second diode D2 is turned off is inhibited by controlling turn-on time of the third switch S3 and the fourth switch S4. The following describes in detail working processes of the first soft switch unit 100 and the second soft switch unit 200.

In the first soft switch unit 100, it is first assumed that the first switch S1 is in a disconnected state, and the first diode D1 is in a turn-on state. Before the first switch S1 is closed, the second switch S2 is first closed. Due to an effect of the first inductor Lr1, a current of the second switch S2 slowly increases starting from zero, to implement zero-current turn-on of the second switch S2. In addition, a current of the first diode D1 slowly decreases, to inhibit the reverse recovery process of the first diode DE When the current of the first diode D1 decreases to zero, the first diode D1 is turned off. As a current of the first inductor Lr1 constantly increases, a voltage of two terminals of the first switch S1 constantly decreases. When the voltage of two terminals of the first switch S1 is zero, the first switch S1 is closed, to implement zero-voltage turn-on of the first switch S1, and then the second switch S2 is disconnected.

Because the first inductor Lr1 stores energy, if the energy in the first inductor Lr1 is not transferred, instantaneous current impact is caused to the second switch S2 when the second switch S2 is closed next time. Consequently, the current of the second switch S2 cannot slowly increase starting from zero. In addition, the current of the first diode D1 cannot slowly decrease. Consequently, an effect of inhibiting reverse recovery of the first diode D1 becomes poor. Therefore, to ensure that reverse recovery of the first diode D1 can be effectively inhibited and zero-current turn-on of the second switch S2 can be implemented each time the second switch S2 is closed, after the second switch S2 is disconnected, the energy of the first inductor Lr1 is transferred by using the first buffer circuit.

In a process in which the first buffer circuit transfers the energy of the first inductor Lr1, when the third switch S3 is in a closed state, a current flows out from the first buffer circuit, and sequentially flows through the flying capacitor Cf and the third switch S3 into the negative electrode of the power supply. In this process, the energy of the first inductor Lr1 is transferred to the flying capacitor Cf by the first buffer circuit. When the third switch S3 is in a disconnected state, the current flows out from the first buffer circuit, and sequentially flows through the second diode D2, the first capacitor C1, and the second capacitor C2 into the negative electrode of the power supply. In this process, the energy of the first inductor Lr1 is transferred to the first capacitor C1 and the second capacitor C2 by the first buffer circuit.

Similarly, in the second soft switch unit 200, it is assumed that the third switch S3 is in a disconnected state, and the second diode D2 is in a turn-on state. Before the third switch S3 is closed, the fourth switch S4 is first closed. Due to an effect of the second inductor Lr2, a current of the fourth switch S4 slowly increases starting from zero, to implement zero-current turn-on of the fourth switch S4. In addition, a current of the second diode D2 slowly decreases, to inhibit the reverse recovery process of the second diode D2. When the current of the second diode D2 decreases to zero, the second diode D2 is turned off. As a current of the second inductor Lr2 constantly increases, a voltage of two terminals of the third switch S3 constantly decreases. When the voltage of two terminals of the third switch S3 is zero, the third switch S3 is closed, to implement zero-voltage turn-on of the third switch S3, and then the fourth switch S4 is disconnected.

Because the second inductor Lr2 also stores energy, to ensure that reverse recovery of the second diode D2 can be effectively inhibited and zero-current turn-on of the fourth switch S4 can be implemented each time the fourth switch S4 is closed, after the fourth switch S4 is disconnected, the energy of the second inductor Lr2 is transferred by using the second buffer circuit.

Specifically, the current flows out from the second buffer circuit, and flows through the second capacitor C2 into the negative electrode of the power supply. In this process, the energy of the second inductor Lr2 is transferred to the second capacitor C2 by the second buffer circuit.

Based on the foregoing analysis, it can be learned that, in this embodiment, the reverse recovery processes in both cases in which the first diode D1 is turned off and the second diode D2 is turned off can be effectively inhibited, so that losses when the first diode D1 and the second diode D2 are turned off can be reduced. Therefore, silicon diodes with a relatively low price can be used as the first diode D1 and the second diode D2, and silicon carbide diodes with a high price do not need to be used as the first diode D1 and the second diode D2 to reduce losses, so that costs of the direct current-direct current conversion circuit and a product to which the direct current-direct current conversion circuit is applied can be further reduced.

It should be understood that, there are a plurality of structures of the first buffer circuit and the second buffer circuit. The following separately describes in detail the first buffer circuit and the second buffer circuit by using one structure as an example.

Figure 9:
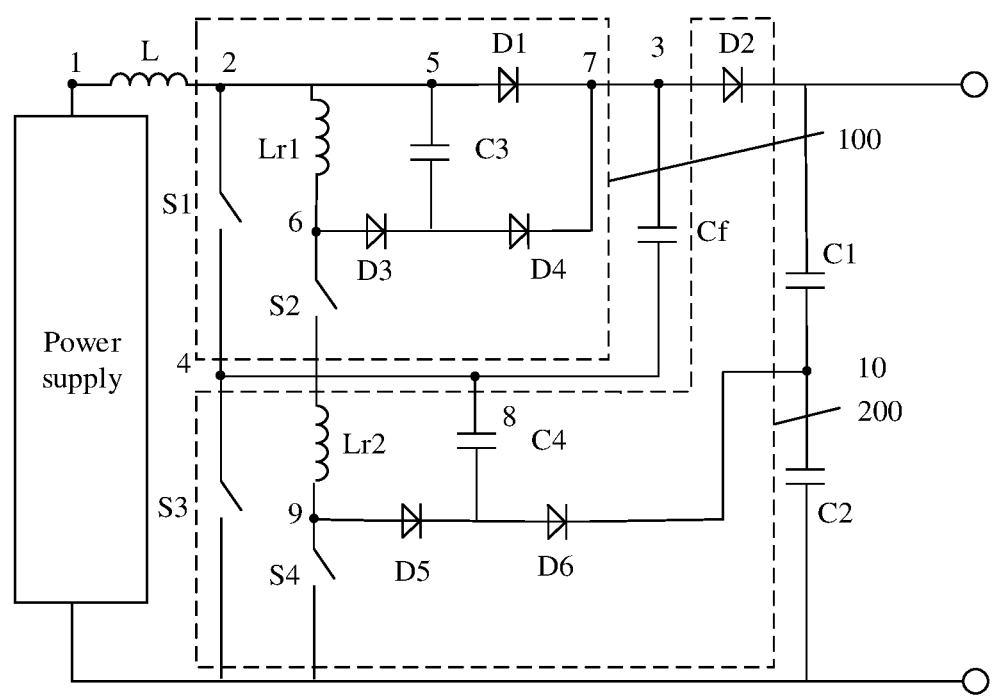
FIG. 9 is a schematic diagram of a second embodiment of a direct current-direct current conversion circuit according to an embodiment of this application.

FIG. 9 is a schematic diagram of a second embodiment of the direct current-direct current conversion circuit according to an embodiment of this application. In this embodiment, the first buffer circuit includes a third diode D3, a fourth diode D4, and a third capacitor C3.

A positive electrode of the third diode D3 is the second terminal 6 of the first buffer circuit, a negative electrode of the third diode D3 is connected to a positive electrode of the fourth diode D4, and a negative electrode of the fourth diode D4 is the third terminal 7 of the first buffer circuit.

A first terminal of the third capacitor C3 is the first terminal 5 of the first buffer circuit, and a second terminal of the third capacitor C3 is connected between the third diode D3 and the fourth diode D4.

Based on the foregoing first buffer circuit, a working process of the first soft switch unit 100 is as follows:

The second switch S2 is first closed. A current of the second switch S2 slowly increases starting from zero, to implement zero-current turn-on of the second switch S2. In addition, a current of the first diode D1 slowly decreases, to inhibit the reverse recovery process of the first diode DE When the current of the first diode D1 decreases to zero, the first diode D1 is turned off. As a current of the first inductor Lr1 constantly increases, a voltage of two terminals of the first switch S1 gradually decreases to zero. In this case, the first switch S1 is closed, to implement zero-voltage turn-on of the first switch S1, and then the second switch S2 is disconnected. In a period in which the second switch S2 is closed, the first buffer circuit does not work, and a voltage of two terminals of the third capacitor C3 is always zero.

When the second switch S2 is disconnected, the first inductor Lr1 implements freewheeling by using the third diode D3 and the third capacitor C3. The first inductor Lr1 charges the third capacitor C3. A voltage of two terminals of the third capacitor C3 constantly increases, and a voltage of a terminal that is of the third capacitor C3 and that is connected to the third diode D3 is a positive voltage, so that the first diode D1 bears a reverse voltage, and finally the energy of the first inductor Lr1 is completely transferred to the third capacitor C3.

When the first switch S1 is disconnected, a current flows out from the positive electrode of the power supply, and a specific flow direction is related to a state of the third switch S3. Because the first diode D1 bears the reverse voltage, the first diode D1 is in a turn-off state. When the third switch S3 is in a closed state, a current sequentially flows through the input inductor L, the third capacitor C3, the fourth diode D4, the flying capacitor Cf, and the third switch S3, and finally flows into the negative electrode of the power supply. In this process, the third capacitor C3 charges the flying capacitor Cf. In this way, energy of the third capacitor C3 is transferred to the flying capacitor Cf, that is, the energy of the first inductor Lr1 is transferred to the flying capacitor Cf. When the third switch S3 is in a disconnected state, a current sequentially flows through the input inductor L, the third capacitor C3, the fourth diode D4, the second diode D2, the first capacitor C1, and the second capacitor C2, and finally flows into the negative electrode of the power supply. In this process, the third capacitor C3 charges the first capacitor C1 and the second capacitor C2. In this way, the energy of the third capacitor C3 is transferred to the first capacitor C1 and the second capacitor C2, that is, the energy of the first inductor Lr1 is transferred to the first capacitor C1 and the second capacitor C2. As the third capacitor C3 constantly discharges, the reverse voltage of two terminals of the first diode D1 gradually decreases. When the reverse voltage of the two terminals of the first diode D1 decreases to zero, the first diode D1 is naturally turned on.

It should be noted that, in this embodiment, parameters of components in the first soft switch unit 100 may be properly set, so that after the third capacitor C3 is charged by the first inductor Lr1, the voltage of the two terminals of the third capacitor C3 is equal to that of the two terminals of the flying capacitor Cf. Based on the fact that the first switch S1, the third capacitor C3, the fourth diode D4, and the flying capacitor Cf form a loop, it can be learned that, during disconnection, the voltage of the two terminals of the first switch S1 is zero, so that zero-voltage turn-off of the first switch S1 can be implemented.

In another embodiment of the direct current-direct current conversion circuit referring to FIG. 9, the second buffer circuit includes a fifth diode D5, a sixth diode D6, and a fourth capacitor C4.

A positive electrode of the fifth diode D5 is the second terminal 9 of the second buffer circuit, a negative electrode of the fifth diode D5 is connected to a positive electrode of the sixth diode D6, and a negative electrode of the sixth diode D6 is the third terminal 10 of the second buffer circuit.

A first terminal of the fourth capacitor C4 is the first terminal 8 of the second buffer circuit, and a second terminal of the fourth capacitor C4 is connected between the fifth diode D5 and the sixth diode D6.

Based on the foregoing second buffer circuit, a working process of the second soft switch unit 200 is as follows:

The fourth switch S4 is first closed. A current of the fourth switch S4 slowly increases starting from zero, to implement zero-current turn-on of the fourth switch S4. In addition, a current of the second diode D2 slowly decreases, to inhibit the reverse recovery process of the second diode D2. When the current of the second diode D2 decreases to zero, the second diode D2 is turned off. As a current of the second inductor Lr2 constantly increases, a voltage of two terminals of the third switch S3 gradually decreases to zero. In this case, the third switch S3 is closed, to implement zero-voltage turn-on of the third switch S3, and then the fourth switch S4 is disconnected. In a period in which the fourth switch S4 is closed, the second buffer circuit does not work, and a voltage of two terminals of the fourth capacitor C4 is always zero.

When the fourth switch S4 is disconnected, the second inductor Lr2 implements freewheeling by using the fifth diode D5 and the fourth capacitor C4. The second inductor Lr2 charges the fourth capacitor C4. A voltage of two terminals of the fourth capacitor C4 constantly increases, and a voltage of a terminal that is of the fourth capacitor C4 and that is connected to the fifth diode D5 is a positive voltage, so that the second diode D2 bears a reverse voltage, and finally the energy of the second inductor Lr2 is completely transferred to the fourth capacitor C4.

When the third switch S3 is disconnected, a current flows out from the positive electrode of the power supply, and a specific flow direction is related to a state of the first switch S1. Because the second diode D2 bears the reverse voltage, the second diode D2 is in a turn-off state. When the first switch S1 is in a closed state, a current sequentially flows through the input inductor L, the first switch S1, the fourth capacitor C4, the sixth diode D6, and the second capacitor C2, and finally flows into the negative electrode of the power supply. In this process, the fourth capacitor C4 charges the second capacitor C2. In this way, energy of the fourth capacitor C4 is transferred to the second capacitor C2, that is, the energy of the second inductor Lr2 is transferred to the second capacitor C2. When the first switch S1 is in a disconnected state, a current sequentially flows through the input inductor L, the first diode D1, the flying capacitor Cf, the fourth capacitor C4, the sixth diode D6, and the second capacitor C2, and finally flows into the negative electrode of the power supply. In this process, the fourth capacitor C4 also charges the second capacitor C2. In this way, the energy of the fourth capacitor C4 is transferred to the second capacitor C2, that is, the energy of the second inductor Lr2 is transferred to the second capacitor C2. As the fourth capacitor C4 constantly discharges, the reverse voltage of two terminals of the second diode D2 gradually decreases. When the reverse voltage of the two terminals of the second diode D2 decreases to zero, the second diode D2 is naturally turned on.

It should be noted that, in this embodiment, parameters of components in the second soft switch unit 200 may be properly set, so that after the fourth capacitor C4 is charged by the second inductor Lr2, the voltage of the two terminals of the fourth capacitor C4 is equal to that of the two terminals of the second capacitor C2. Based on the fact that the third switch S3, the fourth capacitor C4, the sixth diode D6, and the second capacitor C2 form a loop, it can be learned that, during disconnection, the voltage of the two terminals of the second switch S2 is zero, so that zero-voltage turn-off of the second switch S2 can be implemented.

Figure 10:
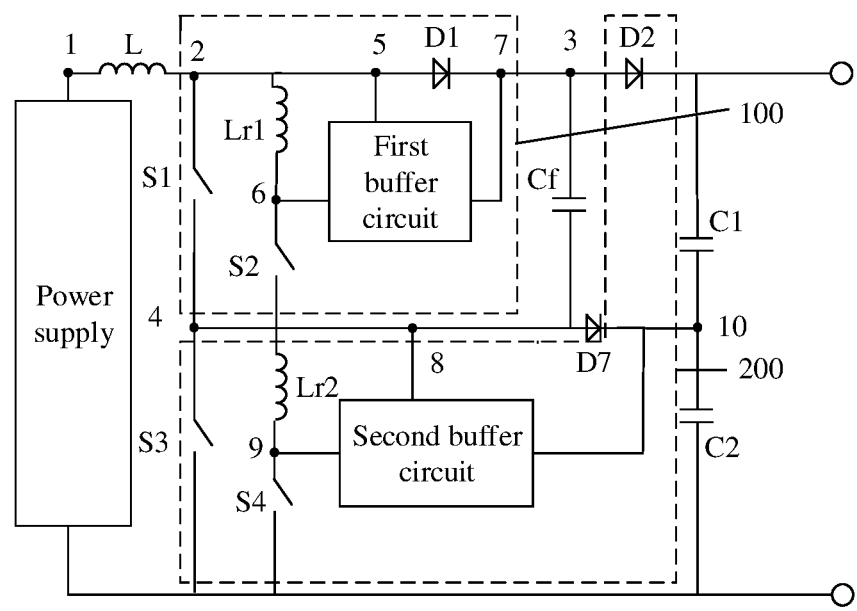
FIG. 10 is a schematic diagram of a third embodiment of a direct current-direct current conversion circuit according to an embodiment of this application.

FIG. 10 is a schematic diagram of a third embodiment of the direct current-direct current conversion circuit according to an embodiment of this application. In this embodiment, the direct current-direct current conversion circuit further includes a seventh diode D7.

A positive electrode of the seventh diode D7 is connected to the second terminal 4 of the flying capacitor Cf, and a negative electrode of the seventh diode D7 is connected between the first capacitor C1 and the second capacitor C2.

In this embodiment, the seventh diode D7 may be disposed to limit a voltage of two terminals of the third switch S3 to below a voltage of two terminals of the second capacitor C2, so that the third switch S3 has no risk of overvoltage. In addition, in a specific scenario, the second diode D2 can be further prevented from being broken down in a circuit power-on process.

For example, in actual application, output terminals of a plurality of direct current-direct current conversion circuits in this embodiment may be used in parallel. In a process of use in parallel, power-on time of the direct current-direct current conversion circuits may be different. After one of the direct current-direct current conversion circuits is powered on, voltages of two terminals of the first capacitor C1 and the second capacitor C2 in all the direct current-direct current conversion circuits are established as an output voltage Vout, and in a direct current-direct current conversion circuit that is not powered on, the voltage of the two terminals of the flying capacitor Cf is still zero.

When the seventh diode D7 is not disposed, the moment the power supply is connected and the third switch S3 is closed to charge the flying capacitor Cf, the second diode D2 bears the entire output voltage Vout. When the seventh diode D7 is disposed, the third switch S3 may not be closed first, and the flying capacitor Cf is pre-charged by using a closed loop including the positive electrode of the power supply, the input inductor L, the flying capacitor Cf, the seventh diode D7, the second capacitor C2, and the negative electrode of the power supply. When the voltage of the flying capacitor Cf is equal to the voltage of the two terminals of the first capacitor C1, pre-charging ends, and then the third switch S3 is closed to continue to charge the flying capacitor Cf. In this case, the voltage born by the second diode D2 is only the voltage of the two terminals of the second capacitor C2, namely, a half of the output voltage Vout. Therefore, the second diode D2 can prevent the second diode D2 from being broken down when bearing the entire output voltage Vout.

It should be understood that, because the energy of the first inductor Lr1 is transferred to the flying capacitor Cf, or to the first capacitor C1 and the second capacitor C2, and the energy of the second inductor Lr2 is transferred only to the second capacitor C2, with an increase of the working time, in the direct current-direct current conversion circuit in this embodiment, the voltage of the first capacitor C1 is not equal to the voltage of the second capacitor C2, and a longer working time indicates a larger difference between the voltages of the first capacitor C1 and the second capacitor C2.

Therefore, in another embodiment of the direct current-direct current conversion circuit, a capacitance balance circuit is added to two terminals of the first capacitor C1 and the second capacitor C2, for balancing voltages of the first capacitor C1 and the second capacitor C2. A first terminal 11 of the capacitance balance circuit is connected to a negative electrode of the second diode D2, a second terminal 12 of the capacitance balance circuit is connected between the first capacitor C1 and the second capacitor C2, and a third terminal 13 of the capacitance balance circuit is connected to the negative electrode of the power supply.

It should be noted that, there may be a plurality of structures of the capacitance balance circuit. The following describes in detail the structures of the capacitance balance circuit by using examples.

Figure 11:
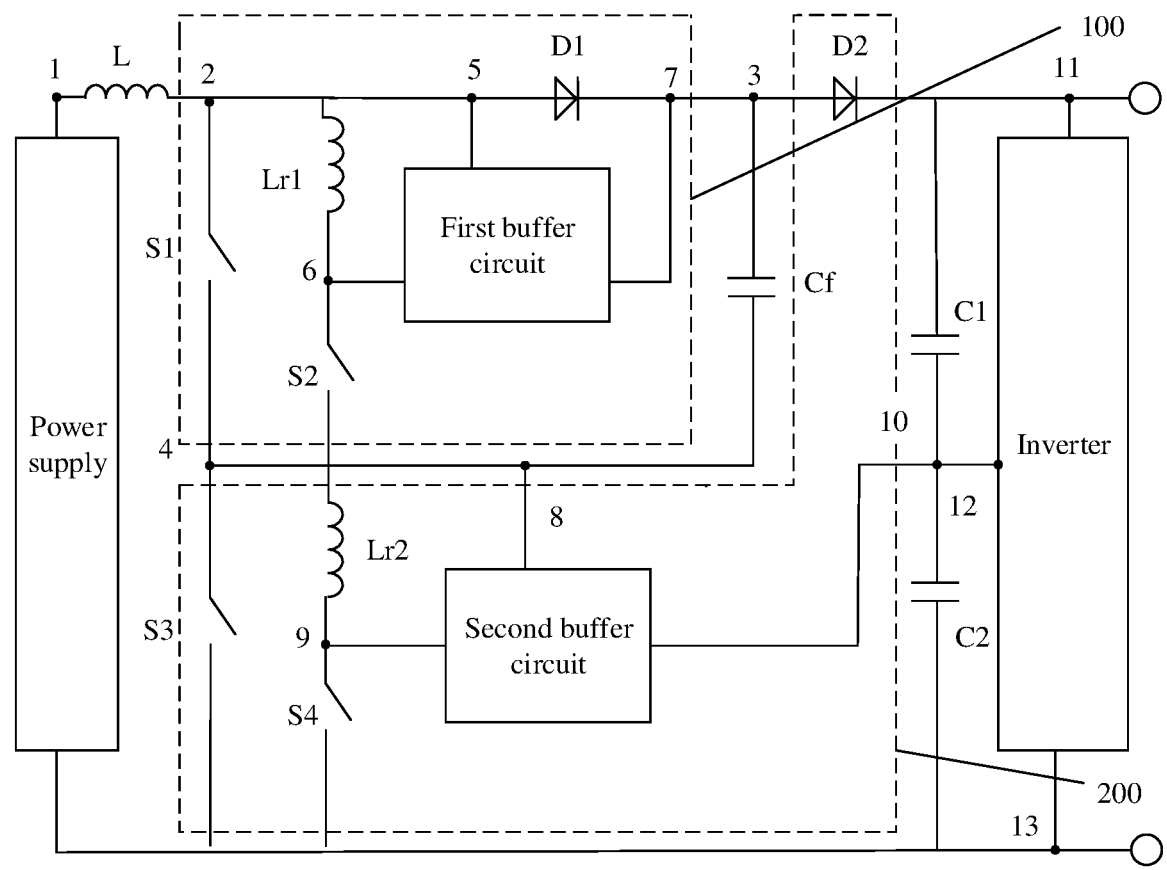
FIG. 11 is a schematic diagram of a fourth embodiment of a direct current-direct current conversion circuit according to an embodiment of this application.

FIG. 11 is a schematic diagram of a fourth embodiment of the direct current-direct current conversion circuit according to an embodiment of this application. In this embodiment, the direct current-direct current conversion circuit further includes an inverter.

A positive input terminal of the inverter is connected to a negative electrode of the second diode D2, a bus capacitance midpoint of the inverter is connected to a connection point between the first capacitor C1 and the second capacitor C2, and a negative input terminal of the inverter is connected to the negative electrode of the power supply.

It may be understood that, the inverter itself can balance the voltages of the first capacitor C1 and the second capacitor C2. Therefore, when the output terminal of the direct current-direct current conversion circuit is further connected to the inverter, the inverter is equivalent to the capacitance balance circuit.

In another embodiment of the direct current-direct current conversion circuit, the capacitance balance circuit includes a third branch, a fourth branch, and a fifth branch.

The third branch includes a ninth diode D9, an eighth diode D8, a sixth switch S6, and a fifth switch S5 that are sequentially connected in series, where a negative electrode of the ninth diode D9 is connected to the negative electrode of the second diode D2, a positive electrode of the ninth diode D9 is connected to a negative electrode of the eighth diode D8, a first terminal of the fifth switch S5 is connected to the sixth switch S6, and a second terminal of the fifth switch S5 is connected to the negative electrode of the power supply.

A first terminal of the fourth branch is connected between the first capacitor C1 and the second capacitor C2, and a second terminal of the fourth branch is connected between the eighth diode D8 and the sixth switch S6.

A first terminal of the fifth branch is connected between the eighth diode D8 and the ninth diode D9, and a second terminal of the fifth branch is connected between the sixth switch S6 and the fifth switch S5.

A fifth capacitor C5 is connected in series in the fifth branch.

A third inductor Lr3 is connected in series in the fifth branch or the third inductor Lr3 is connected in series in the fourth branch.

Figure 12:
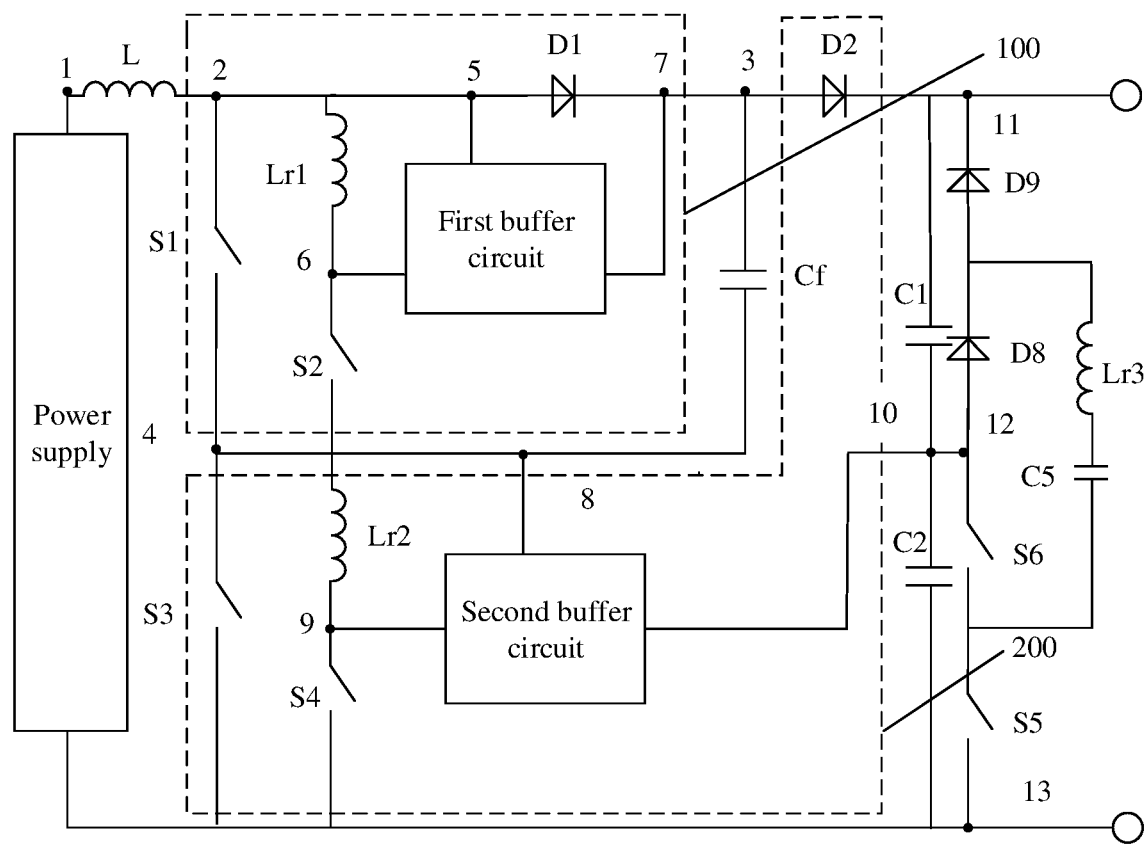
FIG. 12 is a schematic diagram of a fifth embodiment of a direct current-direct current conversion circuit according to an embodiment of this application.
Figure 13:
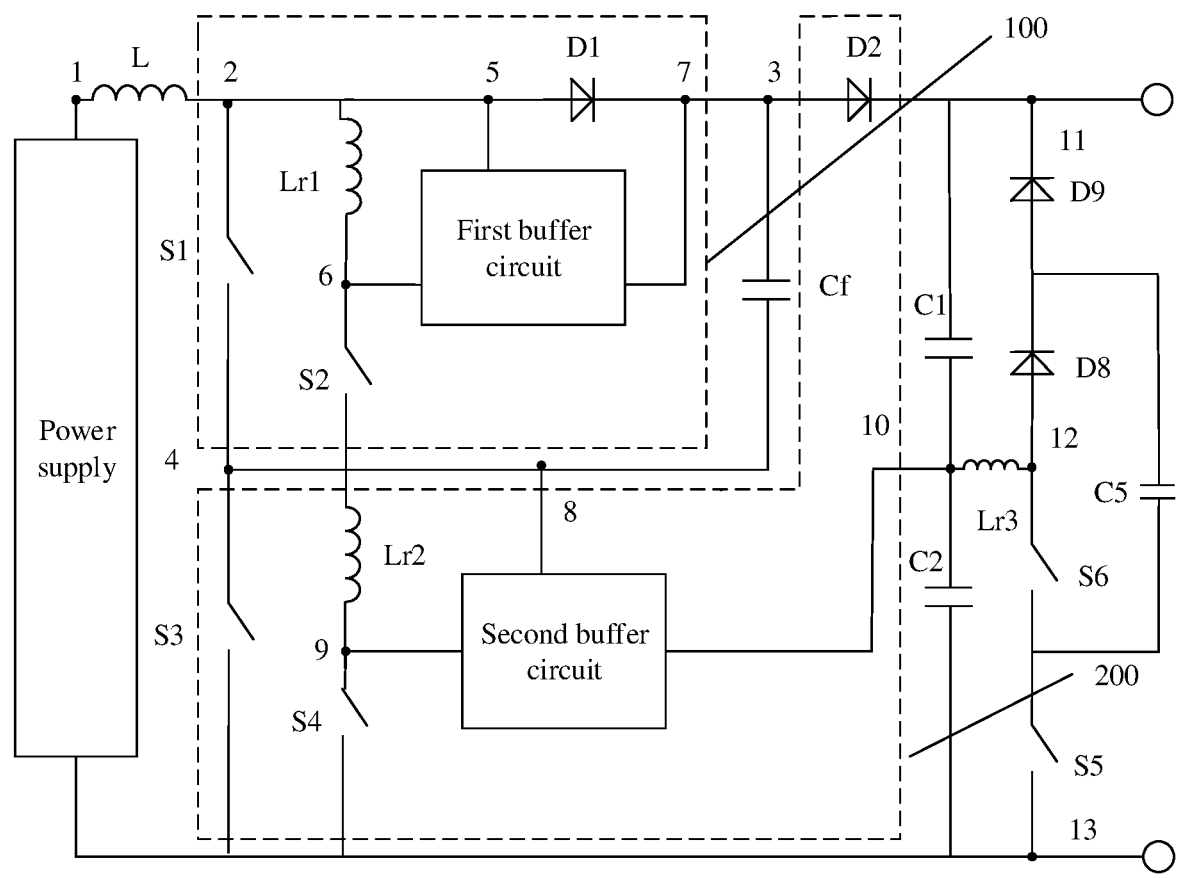
FIG. 13 is a schematic diagram of a sixth embodiment of a direct current-direct current conversion circuit according to an embodiment of this application.

When the third inductor Lr3 is connected in series in the fifth branch, the direct current-direct current conversion circuit provided in this embodiment is shown in FIG. 12. FIG. 12 is a schematic diagram of a fifth embodiment of a direct current-direct current conversion circuit according to an embodiment of this application. When the third inductor Lr3 is connected in series in the fourth branch, the direct current-direct current conversion circuit provided in this embodiment is shown in FIG. 13. FIG. 13 is a schematic diagram of a sixth embodiment of a direct current-direct current conversion circuit according to an embodiment of this application.

Because the direct current-direct current conversion circuit shown in FIG. 12 differs from the direct current-direct current conversion circuit shown in FIG. 13 merely in that positions of the third inductors Lr3 are different, and other structures and working processes are all the same, the following describes a working process of the capacitance balance circuit by using the direct current-direct current conversion circuit shown in FIG. 12 as an example.

First, it should be noted that, in the capacitance balance circuit, the fifth capacitor C5 is charged first, until a voltage of two terminals of the fifth capacitor C5 is equal to the voltage of the two terminals of the first capacitor C1 and the voltage of the two terminals of the second capacitor C2. With an increase of the working time of the direct current-direct current conversion circuit, the voltage of the two terminals of the second capacitor C2 is higher than the voltage of the two terminals of the first capacitor C1. In this case, the fifth switch S5 is closed, and the second capacitor C2 charges the fifth capacitor C5, so that the voltage of the two terminals of the second capacitor C2 is reduced. After the voltage of the two terminals of the second capacitor C2 is equal to the voltage of the two terminals of the fifth capacitor C5, charging ends. In this case, the fifth switch S5 is disconnected and the sixth switch S6 is closed. The fifth capacitor C5 charges the first capacitor C1, so that the voltage of the first capacitor C1 increases. The foregoing process is constantly performed, to balance the voltages of the first capacitor C1 and the second capacitor C2.

In the foregoing voltage balance process, the third inductor Lr3 implements a buffering function, and the eighth diode D8 and the ninth diode D9 implement a function of limiting a current flow direction. In addition, it should be noted that, the foregoing voltage balance process may be performed periodically.

In another embodiment of the direct current-direct current conversion circuit, the capacitance balance circuit includes a sixth branch, a seventh branch, and an eighth branch.

The sixth branch includes a tenth switch S10, a ninth switch S9, an eighth switch S8, and a seventh switch S7 that are sequentially connected in series, where a first terminal of the tenth switch S10 is connected to the negative electrode of the second diode D2, a second terminal of the tenth switch S10 is connected to the ninth switch S9, a first terminal of the seventh switch S7 is connected to the eighth switch S8, and a second terminal of the seventh switch S7 is connected to the negative electrode of the power supply.

A first terminal of the seventh branch is connected between the first capacitor C1 and the second capacitor C2, and a second terminal of the seventh branch is connected between the eighth switch S8 and the ninth switch S9.

A first terminal of the eighth branch is connected between the ninth switch S9 and the tenth switch S10, and a second terminal of the eighth branch is connected between the seventh switch S7 and the eighth switch S8.

A sixth capacitor C6 is connected in series in the eighth branch.

A fourth inductor Lr4 is further connected in series in the eighth branch or the fourth inductor Lr4 is connected in series in the fourth branch.

Figure 14:
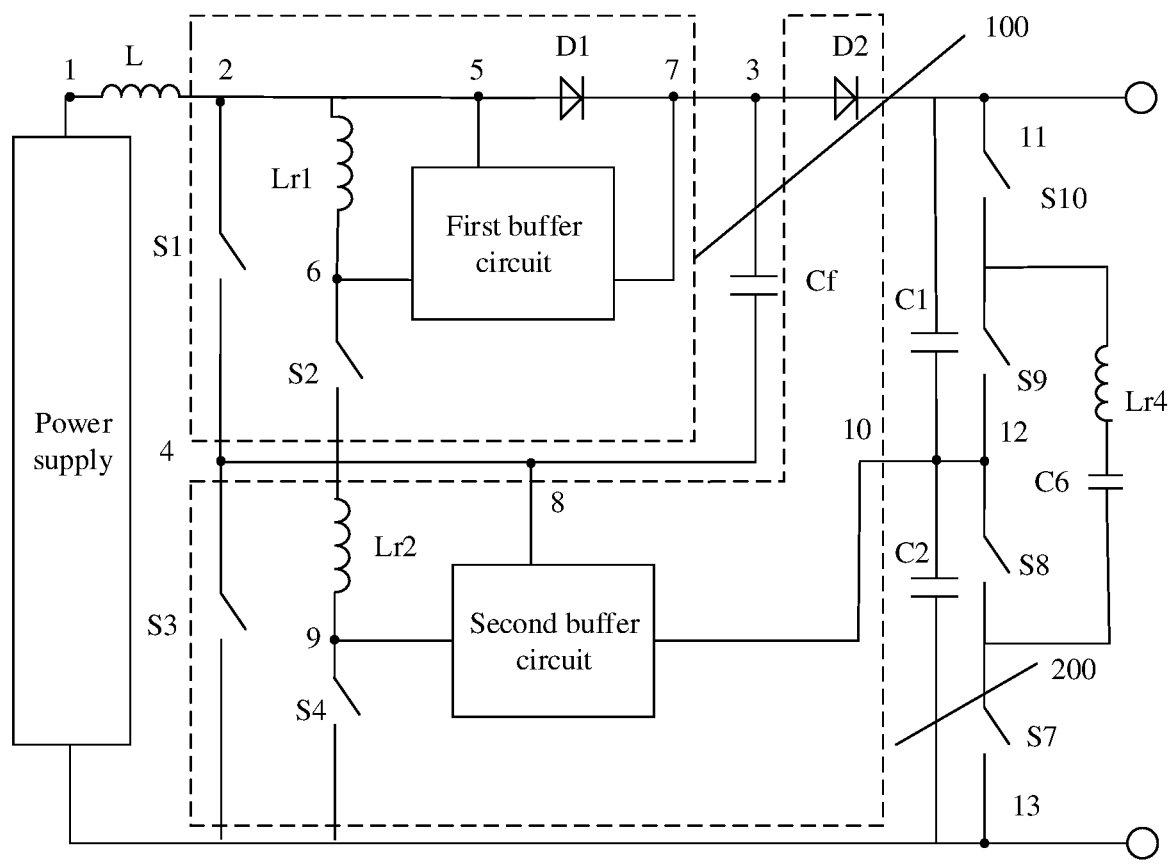
FIG. 14 is a schematic diagram of a seventh embodiment of a direct current-direct current conversion circuit according to an embodiment of this application.
Figure 15:
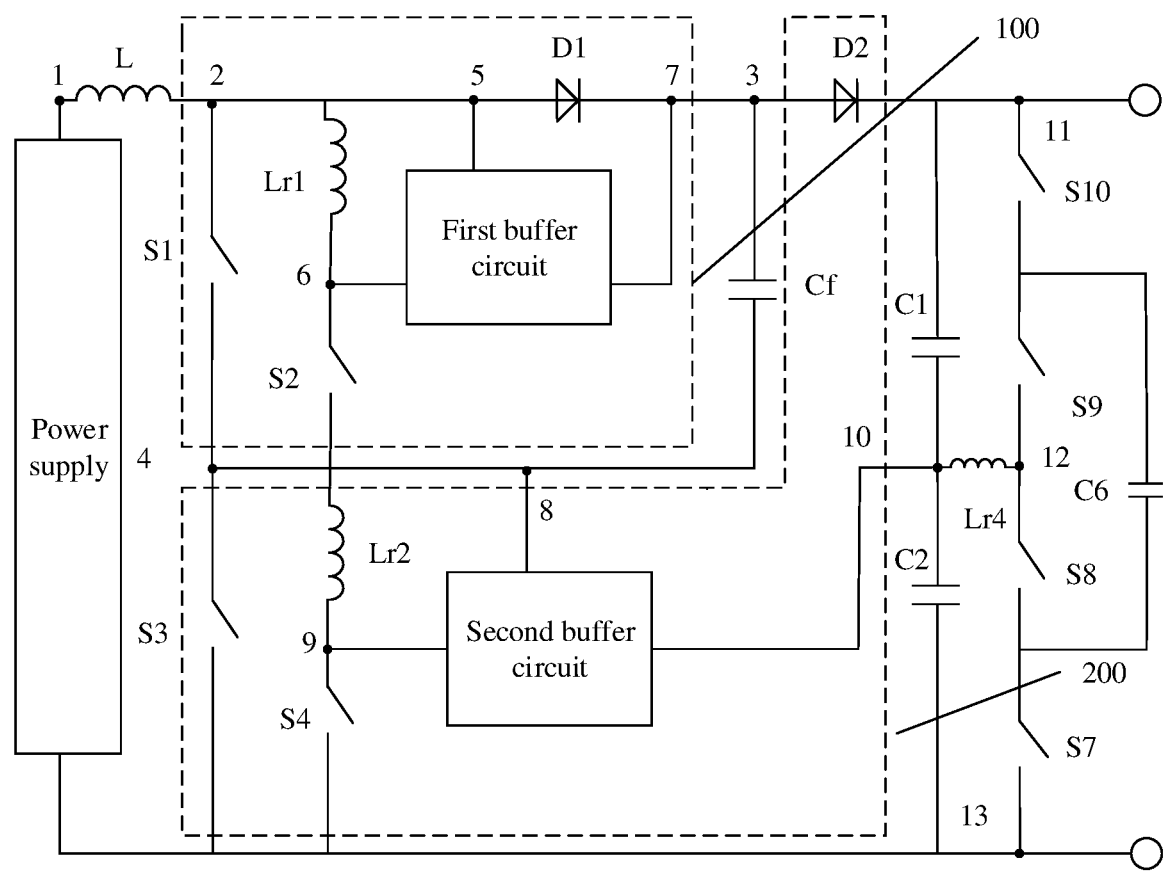
FIG. 15 is a schematic diagram of an eighth embodiment of a direct current-direct current conversion circuit according to an embodiment of this application.

When the fourth inductor Lr4 is connected in series in the eighth branch, the direct current-direct current conversion circuit provided in this embodiment is shown in FIG. 14. FIG. 14 is a schematic diagram of a seventh embodiment of a direct current-direct current conversion circuit according to an embodiment of this application. When the fourth inductor Lr4 is connected in series in the fourth branch, the direct current-direct current conversion circuit provided in this embodiment is shown in FIG. 15. FIG. 15 is a schematic diagram of an eighth embodiment of a direct current-direct current conversion circuit according to an embodiment of this application.

Because the direct current-direct current conversion circuit shown in FIG. 14 differs from the direct current-direct current conversion circuit shown in FIG. 15 merely in that positions of the fourth inductors Lr4 are different, and other structures and working processes are all the same, the following describes a working process of the capacitance balance circuit by using the direct current-direct current conversion circuit shown in FIG. 14 as an example.

Same as the direct current-direct current conversion circuit shown in FIG. 12, in the capacitance balance circuit, the sixth capacitor C6 is also charged first, until a voltage of two terminals of the sixth capacitor C6 is equal to the voltage of the two terminals of the first capacitor C1 and the voltage of the two terminals of the second capacitor C2. With an increase of the working time of the direct current-direct current conversion circuit, the voltage of the two terminals of the second capacitor C2 is higher than the voltage of the two terminals of the first capacitor C1. In this case, the ninth switch S9 and the seventh switch S7 are closed, and the second capacitor C2 charges the sixth capacitor C6, so that the voltage of the second capacitor C2 is reduced. After the voltage of the two terminals of the second capacitor C2 is equal to the voltage of the two terminals of the sixth capacitor C6, the charging ends. In this case, the ninth switch S9 and the seventh switch S7 are disconnected and the tenth switch S10 and the eighth switch S8 are closed. The sixth capacitor C6 charges the first capacitor C1, so that the voltage of the two terminals of the first capacitor C1 increases. The foregoing process is constantly performed, to balance the voltages of the first capacitor C1 and the second capacitor C2.

In the foregoing voltage balance process, the fourth inductor Lr4 implements a buffering function in the foregoing process. In addition, it should be noted that, the foregoing voltage balance process may be performed periodically.

Upon comparison between FIG. 3 and FIG. 4, it can be learned that, in the direct current-direct current conversion circuit in the embodiment of this application shown in FIG. 3, components are newly added based on the flying capacitor Cf based boost chopper circuit shown in FIG. 4 to form the first soft switch unit 100 and the second soft switch unit 200. Because the first soft switch unit 100 includes the newly added second switch S2, and the second soft switch unit 200 includes the newly added fourth switch S4, the first soft switch unit 100 and the second soft switch unit 200 are also referred to as active soft switch units. Correspondingly, the direct current-direct current conversion circuit shown in FIG. 3 is an active direct current-direct current conversion circuit. The foregoing describes the active direct current-direct current conversion circuit. The following describes in detail a passive direct current-direct current conversion circuit including passive soft switch units.

Figure 16:
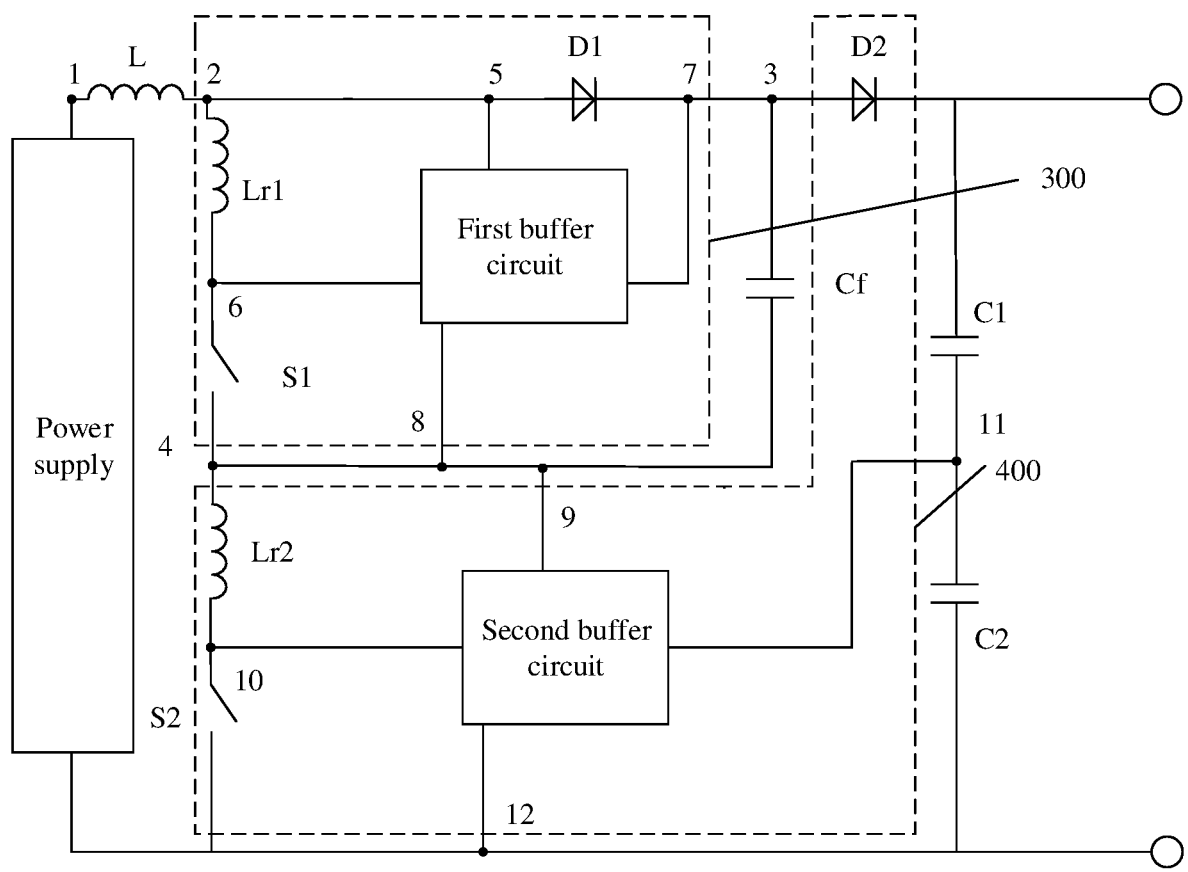
FIG. 16 is a schematic diagram of a ninth embodiment of a direct current-direct current conversion circuit according to an embodiment of this application.

FIG. 16 is a schematic diagram of a ninth embodiment of a direct current-direct current conversion circuit according to an embodiment of this application.

The ninth embodiment of the direct current-direct current conversion circuit includes:

an input inductor L, a first capacitor C1, a second capacitor C2, a flying capacitor Cf, a first soft switch unit 300, and a second soft switch unit 400.

The first soft switch unit 300 includes a first switch S1, a first inductor Lr1, a first diode D1, and a first buffer circuit, and the second soft switch unit 400 includes a second switch S2, a second inductor Lr2, a second diode D2, and a second buffer circuit.

The first switch S1 and the second switch S2 may be a metal-oxide semiconductor field effect transistor or an insulated gate bipolar transistor.

A power supply, the input inductor L, the first diode D1, the second diode D2, the first capacitor C1, and the second capacitor C2 are sequentially connected in series, where a first terminal 1 of the input inductor L is connected to a positive electrode of the power supply, a second terminal 2 of the input inductor L is connected to a positive electrode of the first diode D1, and a negative electrode of the first diode D1 is connected to a positive electrode of the second diode D2.

It may be understood that, the power supply may be any circuit module that can output a current. When the direct current-direct current conversion circuit is applied to a photovoltaic power generation system, the power supply may be a photovoltaic module.

A first branch is connected in parallel between the second terminal 2 of the input inductor L and a negative electrode of the power supply, the first branch includes the first inductor Lr1, the first switch S1, the second inductor Lr2, and the second switch S2 that are sequentially connected in series, and the first inductor Lr1 is connected to the second terminal 2 of the input inductor L. As shown in FIG. 16, the second switch S2 is connected to the negative electrode of the power supply.

A first terminal 3 of the flying capacitor Cf is connected between the first diode D1 and the second diode D2, and a second terminal 4 of the flying capacitor Cf is connected between the first switch S1 and the second inductor Lr2.

A first terminal 5 of the first buffer circuit is connected to the positive electrode of the first diode D1, a second terminal 6 of the first buffer circuit is connected between the first inductor Lr1 and the first switch S1, a third terminal 7 of the first buffer circuit is connected to the negative electrode of the first diode D1, and a fourth terminal 8 of the first buffer circuit is connected to the second terminal 4 of the flying capacitor Cf.

After the first switch S1 is disconnected, the first buffer circuit is configured to transfer energy of the first inductor Lr1 to the flying capacitor Cf, or to the first capacitor C1 and the second capacitor C2.

A first terminal 9 of the second buffer circuit is connected to the second terminal 4 of the flying capacitor Cf, a second terminal 10 of the second buffer circuit is connected between the second inductor Lr2 and the second switch S2, a third terminal 11 of the second buffer circuit is connected between the first capacitor C1 and the second capacitor C2, and a fourth terminal 12 of the second buffer circuit is connected to the negative electrode of the power supply.

After the second switch S2 is disconnected, the second buffer circuit is configured to transfer energy of the second inductor Lr2 to the second capacitor C2.

The following analyzes working states of the direct current-direct current conversion circuit in this embodiment based on the foregoing circuit structure. Herein, it is also assumed that the input inductor L, the first capacitor C1, the second capacitor C2, and the flying capacitor Cf are all sufficiently large, to ensure that in a working process of the direct current-direct current conversion circuit, a voltage Vf of two terminals of the flying capacitor Cf and output voltages Vout of two terminals of the first capacitor C1 and of two terminals of the second capacitor C2 remain basically unchanged.

Figure 17:
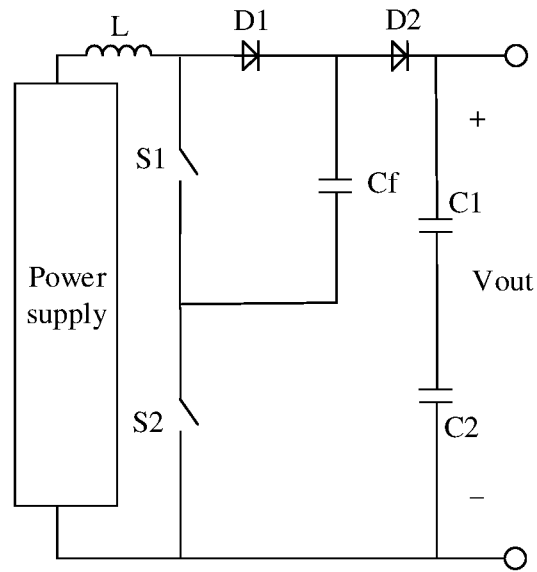
FIG. 17 is a schematic diagram of a second embodiment of a flying capacitor based boost chopper circuit.

Similar to the foregoing embodiment, the input inductor L, the first switch S1, the second switch S2, the first diode D1, the second diode D2, the flying capacitor Cf, the first capacitor C1, and the second capacitor C2 may constitute the flying capacitor Cf based boost chopper circuit shown in FIG. 17. It can be learned based on a working principle of the flying capacitor Cf based boost chopper circuit that, when the boost chopper circuit shown in FIG. 17 works normally, an output voltage Vout is greater than a power supply voltage Vin, and voltages of the first capacitor C1 and the second capacitor C2 always remain the same. In addition, switching states of the first switch S1 and the second switch S2 are changed by using a control signal, so that the direct current-direct current conversion circuit in this embodiment can work in the following four working states.

When the direct current-direct current conversion circuit is in a first working state, a schematic diagram of a current path is the same as that shown in FIG. 5. The first switch S1 and the second switch S2 are in a disconnected state, and a current flows out from the positive electrode of the power supply, and sequentially flows through the input inductor L, the first diode D1, the second diode D2, the first capacitor C1, and the second capacitor C2 into the negative electrode of the power supply, and the input inductor L charges the first capacitor C1 and the second capacitor C2. A voltage of a connection point between the input inductor L and the first switch S1 is Vout.

Figure 18:
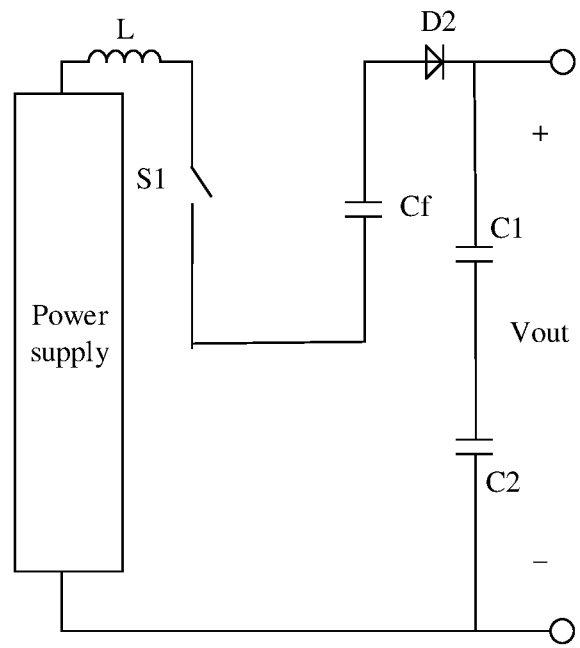
FIG. 18 is a schematic diagram of a fifth embodiment of a current path when a direct current-direct current conversion circuit is in a second working state.

FIG. 18 is a schematic diagram of a fifth embodiment of a current path when a direct current-direct current conversion circuit is in a second working state. When the direct current-direct current conversion circuit is in the second working state, the first switch S1 is in a closed state, and the second switch S2 is in a disconnected state. A current flows out from the positive electrode of the power supply, and sequentially flows through the input inductor L, the first switch S1, the flying capacitor Cf, the second diode D2, the first capacitor C1, and the second capacitor C2 into the negative electrode of the power supply, and the input inductor L and the flying capacitor Cf jointly charge the first capacitor C1 and the second capacitor C2. A voltage of a connection point between the input inductor L and the first switch S1 is Vout−Vf.

Figure 19:
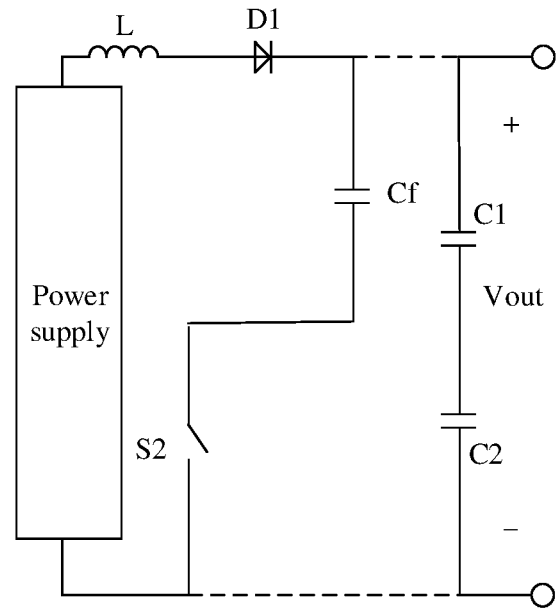
FIG. 19 is a schematic diagram of a sixth embodiment of a current path when a direct current-direct current conversion circuit is in a third working state.

FIG. 19 is a schematic diagram of a sixth embodiment of a current path when a direct current-direct current conversion circuit is in a third working state. When the direct current-direct current conversion circuit is in the third working state, the second switch S2 is in a closed state, and the first switch S1 is in a disconnected state. A current flows out from the positive electrode of the power supply, and sequentially flows through the input inductor L, the first diode D1, the flying capacitor Cf, and the second switch S2 into the negative electrode of the power supply, and the power supply charges the input inductor L and the flying capacitor Cf. A voltage of a connection point between the input inductor L and the first switch S1 is Vf.

Figure 20:
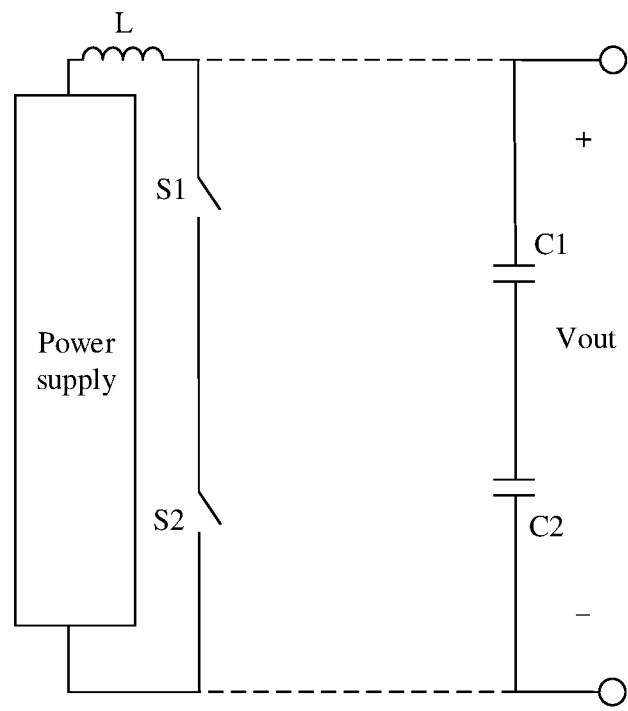
FIG. 20 is a schematic diagram of a seventh embodiment of a current path when a direct current-direct current conversion circuit is in a fourth working state.

FIG. 20 is a schematic diagram of a seventh embodiment of a current path when a direct current-direct current conversion circuit is in a fourth working state. When the direct current-direct current conversion circuit is in the fourth working state, the first switch S1 and the second switch S2 are in a closed state. A current flows out from the positive electrode of the power supply, and sequentially flows through the first switch S1 and the second switch S2 into the negative electrode of the power supply, and the power supply charges the input inductor L. A voltage of a connection point between the input inductor L and the first switch S1 is 0.

When a duty cycle D of the control signal is greater than 0.5, in a working period, the direct current-direct current conversion circuit works sequentially in the second working state, the fourth working state, and the third working state, to implement three-level output. When the duty cycle D of the control signal is less than 0.5, in a working period, the direct current-direct current conversion circuit works sequentially in the second working state, the first working state, and the third working state, to implement three-level output. In addition, because the negative electrode of the power supply is directly connected to the second capacitor C2 by using a wire, regardless of a change of the working state of the direct current-direct current conversion circuit, a voltage of any position between the negative electrode of the power supply and the second capacitor C2 does not change. To be specific, a common mode voltage does not change. Therefore, no common mode current is generated.

It should be understood that, with switching of switching states of the first switch S1 and the second switch S2, working states of the first diode D1 and the second diode D2 also constantly switch between turn-on and turn-off. A reverse recovery process exists in both cases in which the first diode D1 is turned off and the second diode D2 is turned off. An additional loss is generated in the reverse recovery process, and the loss gradually increases with an increase of switching frequency. Therefore, based on the boost chopper circuit shown in FIG. 17, in this embodiment, the first inductor Lr1 and the first buffer circuit are added to form the first soft switch unit 300 together with the first diode D1 and the first switch S1, to inhibit the reverse recovery process when the first diode D1 is turned off. In addition, the second inductor Lr2 and the second buffer circuit are added to form the second soft switch unit 400 together with the second switch S2 and the second diode D2, to inhibit the reverse recovery process when the second diode D2 is turned off. The following describes in detail working processes of the first soft switch unit 300 and the second soft switch unit 400.

In the first soft switch unit 300, it is first assumed that the first switch S1 is in a disconnected state, and the first diode D1 is in a turn-on state. Then the first switch S1 is closed. Due to an effect of the first inductor Lr1, a current of the first switch S1 slowly increases starting from zero, to implement zero-current turn-on of the first switch S1. In addition, a current of the first diode D1 slowly decreases, to inhibit the reverse recovery process of the first diode DE When the current of the first diode D1 decreases to zero, the first diode D1 is turned off.

Because the first inductor Lr1 stores energy, if the energy in the first inductor Lr1 is not transferred, instantaneous current impact is caused to the first switch S1 when the first switch S1 is closed next time. Consequently, the current of the first switch S1 cannot slowly increase starting from zero. In addition, the current of the first diode D1 cannot slowly decrease. Consequently, an effect of inhibiting reverse recovery of the first diode D1 becomes poor. Therefore, to ensure that reverse recovery of the first diode D1 can be effectively inhibited each time the first switch S1 is closed, after the first switch S1 is disconnected, the energy of the first inductor Lr1 is transferred by using the first buffer circuit.

In a process in which the first buffer circuit transfers the energy of the first inductor Lr1, when the second switch S2 is in a closed state, a current flows out from the first buffer circuit, and sequentially flows through the flying capacitor Cf and the second switch S2 into the negative electrode of the power supply. In this process, the energy of the first inductor Lr1 is transferred to the flying capacitor Cf by the first buffer circuit. When the second switch S2 is in a disconnected state, the current flows out from the first buffer circuit, and sequentially flows through the second diode D2, the first capacitor C1, and the second capacitor C2 into the negative electrode of the power supply. In this process, the energy of the first inductor Lr1 is transferred to the first capacitor C1 and the second capacitor C2 by the first buffer circuit.

Similarly, in the second soft switch unit 400, it is first assumed that the second switch S2 is in a disconnected state, and the second diode D2 is in a turn-on state. Then, the second switch S2 is closed. Due to an effect of the second inductor Lr2, a current of the second switch S2 slowly increases starting from zero, to implement zero-current turn-on of the second switch S2. In addition, a current of the second diode D2 slowly decreases, to inhibit the reverse recovery process of the second diode D2. When the current of the second diode D2 decreases to zero, the second diode D2 is turned off.

Because the second inductor Lr2 also stores energy, based on a reason the same as that of the first soft switch unit 300, to ensure that reverse recovery of the second diode D2 can be effectively inhibited each time the second switch S2 is closed, after the second switch S2 is disconnected, the energy of the second inductor Lr2 is transferred by using the second buffer circuit. Specifically, in a process in which the second buffer circuit transfers the energy of the second inductor Lr2, the current flows out from the second buffer circuit, and may flow through the second capacitor C2 into the negative electrode of the power supply. In this process, the energy of the second inductor Lr2 is transferred to the second capacitor C2 by the second buffer circuit.

Based on the foregoing analysis, it can be learned that, in this embodiment, the reverse recovery processes in both cases in which the first diode D1 is turned off and the second diode D2 is turned off can be effectively inhibited, so that losses of the first diode D1 and the second diode D2 can be reduced. Therefore, silicon diodes with a relatively low price can be used as the first diode D1 and the second diode D2, and silicon carbide diodes with a high price do not need to be used as the first diode D1 and the second diode D2 to reduce losses, so that costs of the direct current-direct current conversion circuit can be further reduced.

It should be understood that, there are a plurality of structures of the first buffer circuit and the second buffer circuit. The following separately describes in detail the first buffer circuit and the second buffer circuit by using one structure as an example.

Figure 21:
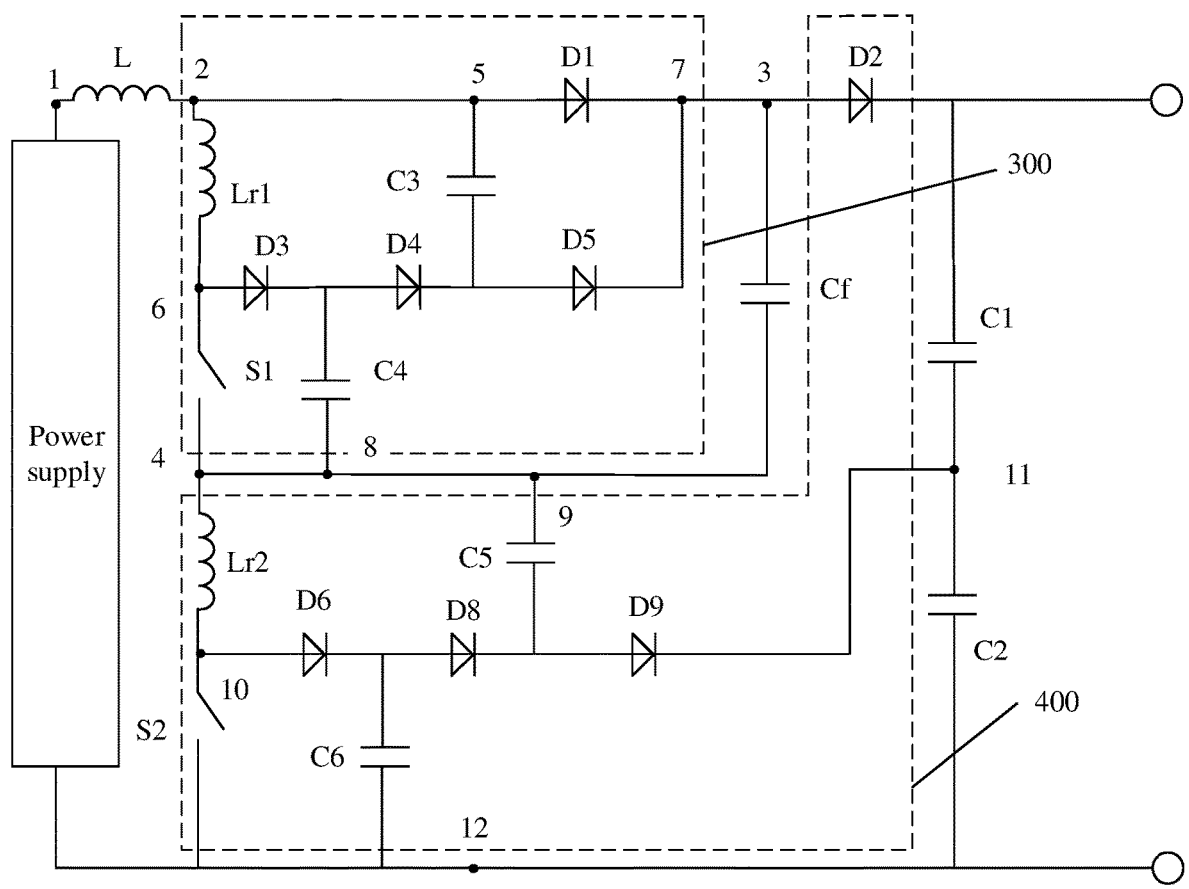
FIG. 21 is a schematic diagram of a tenth embodiment of a direct current-direct current conversion circuit according to an embodiment of this application.

FIG. 21 is a schematic diagram of a tenth embodiment of the direct current-direct current conversion circuit according to an embodiment of this application. In this embodiment, the first buffer circuit includes a third diode D3, a fourth diode D4, a fifth diode D5, a third capacitor C3, and a fourth capacitor C4.

A positive electrode of the third diode D3 is the second terminal 6 of the first buffer circuit, and a negative electrode of the third diode D3 is connected to a positive electrode of the fourth diode D4.

A negative electrode of the fourth diode D4 is connected to a positive electrode of the fifth diode D5, and a negative electrode of the fifth diode D5 is the third terminal 7 of the first buffer circuit.

A first terminal of the third capacitor C3 is the first terminal 5 of the first buffer circuit, and a second terminal of the third capacitor C3 is connected between the fourth diode D4 and the fifth diode D5.

A first terminal of the fourth capacitor C4 is connected between the third diode D3 and the fourth diode D4, and a second terminal of the fourth capacitor C4 is the fourth terminal 8 of the first buffer circuit.

Based on the foregoing first buffer circuit, a working process of the first soft switch unit 300 is as follows:

First, it should be noted that, when the first switch S1 is in a disconnected state and the first diode D1 is in a turn-on state, the voltage of the two terminals of the fourth capacitor C4 is equal to the voltage of the two terminals of the flying capacitor Cf, and a voltage that is of a terminal of the fourth capacitor C4 and that is connected to the flying capacitor Cf is a negative voltage. In this case, the first switch S1 is closed, and a current of the first switch S1 slowly increases starting from zero, to implement zero-current turn-on of the first switch S1. In addition, a current of the first diode D1 slowly decreases, to inhibit the reverse recovery process of the first diode DE When the current of the first diode D1 decreases to zero, the first diode D1 is turned off. After the first switch S1 is closed, a current flows out from the positive electrode of the power supply, and flows through the input inductor L, the first inductor Lr1, and the first switch S1 to the flying capacitor Cf. In addition, a closed loop including the first inductor Lr1, the first switch S1, the fourth capacitor C4, the fourth diode D4, and the third capacitor C3 starts to resonate for the first time. The fourth capacitor C4 charges the third capacitor C3 and the first inductor Lr1. After the voltage of the two terminals of the fourth capacitor C4 decreases to zero, the third diode D3 is naturally turned on, and the first resonance ends. The voltage of the two terminals of the fourth capacitor C4 remains zero, and a closed loop including the first inductor Lr1, the third diode D3, the fourth diode D4, and the third capacitor C3 starts to resonate for the second time. The first inductor Lr1 charges the third capacitor C3. After a current of the third capacitor C3 is zero, the second resonance ends. The third diode D3 and the fourth diode D4 are naturally turned off. The voltage of the two terminals of the third capacitor C3 remains unchanged. The first diode D1 bears a reverse voltage.

When the first switch S1 is disconnected, the first inductor Lr1 implements freewheeling by using the third diode D3. A current sequentially flows through the first inductor Lr1, the third diode D3, and the fourth capacitor C4 to the flying capacitor Cf. The first inductor Lr1 charges the fourth capacitor C4. Because the voltage of the two terminals of the fourth capacitor C4 constantly increases starting from zero, zero-voltage turn-off of the first switch S1 is implemented. After the voltage of the two terminals of the fourth capacitor C4 increases to be equal to the voltage of the two terminals of the flying capacitor Cf, the fourth diode D4 and the fifth diode D5 are naturally turned on. In this case, a part of the current sequentially flows through the first inductor Lr1, the third diode D3, the fourth diode D4, and the fifth diode D5. In this process, the first inductor Lr1 discharges, and the remaining current sequentially flows through the third capacitor C3 and the fifth diode D5. In this process, the third capacitor C3 discharges.

After a current flows out from the fifth diode D5, a specific flow direction is related to a state of the second switch S2. When the second switch S2 is in a closed state, a current sequentially flows through the flying capacitor Cf and the second switch S2, and finally flows into the negative electrode of the power supply. In this process, the third capacitor C3 and the first inductor Lr1 charge the flying capacitor Cf. In this way, energy of the first inductor Lr1 and the third capacitor C3 is transferred to the flying capacitor Cf. When the second switch S2 is in a disconnected state, a current sequentially flows through the second diode D2, the first capacitor C1, and the second capacitor C2, and finally flows into the negative electrode of the power supply. In this process, the third capacitor C3 and the first inductor Lr1 charge the first capacitor C1 and the second capacitor C2. In this way, the energy of the first inductor Lr1 and the third capacitor C3 is transferred to the first capacitor C1 and the second capacitor C2. As the third capacitor C3 constantly discharges, the reverse voltage of two terminals of the first diode D1 gradually decreases. When the reverse voltage of the two terminals of the first diode D1 decreases to zero, the first diode D1 is naturally turned on. After the first inductor Lr1 finishes charging, the first diode D1 is completely turned on.

FIG. 21 is a schematic diagram of a tenth embodiment of the direct current-direct current conversion circuit according to an embodiment of this application. In this embodiment, the second buffer circuit includes a sixth diode D6, an eighth diode D8, a ninth diode D9, a fifth capacitor C5, and a sixth capacitor C6.

A positive electrode of the sixth diode D6 is the second terminal 10 of the second buffer circuit, and a negative electrode of the sixth diode D6 is connected to a positive electrode of the eighth diode D8.

A negative electrode of the eighth diode D8 is connected to a positive electrode of the ninth diode D9, and a negative electrode of the ninth diode D9 is the third terminal 11 of the second buffer circuit.

A first terminal of the fifth capacitor C5 is the first terminal 9 of the second buffer circuit, and a second terminal of the fifth capacitor C5 is connected between the eighth diode D8 and the ninth diode D9.

A first terminal of the sixth capacitor C6 is connected between the sixth diode D6 and the eighth diode D8, and a second terminal of the sixth capacitor C6 is the fourth terminal 12 of the second buffer circuit.

Based on the foregoing second buffer circuit, a working process of the second soft switch unit 400 is as follows:

First, it should be noted that, when the second switch S2 is in a disconnected state and the second diode D2 is in a turn-on state, the voltage of the two terminals of the sixth capacitor C6 is equal to the voltage of the two terminals of the flying capacitor Cf, and a voltage that is of a terminal of the sixth capacitor C6 and that is connected to the negative electrode of the power supply is a negative voltage. In this case, the second switch S2 is closed, and a current of the second switch S2 slowly increases starting from zero, to implement zero-current turn-on of the second switch S2. In addition, a current of the second diode D2 slowly decreases, to inhibit the reverse recovery process of the second diode D2. When the current of the second diode D2 decreases to zero, the second diode D2 is turned off. After the second switch S2 is closed, a current flows through the second inductor Lr2 and the second switch S2 to the negative electrode of the power supply. In addition, a closed loop including the second inductor Lr2, the second switch S2, the sixth capacitor C6, the eighth diode D8, and the fifth capacitor C5 starts to resonate for the first time. The sixth capacitor C6 discharges to the fifth capacitor C5 and the second inductor Lr2. After the voltage of the two terminals of the sixth capacitor C6 decreases to zero, the sixth diode D6 is naturally turned on, and the first resonance ends. The voltage of the two terminals of the sixth capacitor C6 remains zero, and a closed loop including the first inductor Lr1, the sixth diode D6, the eighth diode D8, and the fifth capacitor C5 starts to resonate for the second time. The second inductor Lr2 charges the fifth capacitor C5. After a current of the fifth capacitor C5 is zero, the second resonance ends. The sixth diode D6 and the eighth diode D8 are naturally turned off. The voltage of the two terminals of the fifth capacitor C5 remains unchanged. The second diode D2 bears a reverse voltage.

When the second switch S2 is disconnected, the second inductor Lr2 implements freewheeling by using the sixth diode D6. A current sequentially flows through the second inductor Lr2, the sixth diode D6, and the sixth capacitor C6 to the negative electrode of the power supply. The second inductor Lr2 charges the sixth capacitor C6. Because the voltage of the two terminals of the sixth capacitor C6 constantly increases starting from zero, zero-voltage turn-off of the second switch S2 is implemented. After the voltage of the two terminals of the sixth capacitor C6 increases to be equal to the voltage of the two terminals of the second capacitor C2, the eighth diode D8 and the ninth diode D9 are naturally turned on. In this case, a part of the current flows through the second inductor Lr2, the sixth diode D6, the eighth diode D8, the ninth diode D9, and the second capacitor C2, and finally flows to the negative electrode of the power supply. In this process, the second inductor Lr2 charges the second capacitor C2, and the remaining current flows through the fifth capacitor C5, the ninth diode D9, and the second capacitor C2, and finally flows to the negative electrode of the power supply. In this process, the fifth capacitor C5 charges the second capacitor C2. In this way, energy of the second inductor Lr2 and the fifth capacitor C5 is transferred to the second capacitor C2. As the fifth capacitor C5 constantly discharges, the reverse voltage of the two terminals of the second diode D2 gradually decreases. When the reverse voltage of the two terminals of the second diode D2 decreases to zero, the second diode D2 is naturally turned on. After the second inductor Lr2 finishes discharging, the first diode D1 is completely turned on.

Figure 22:
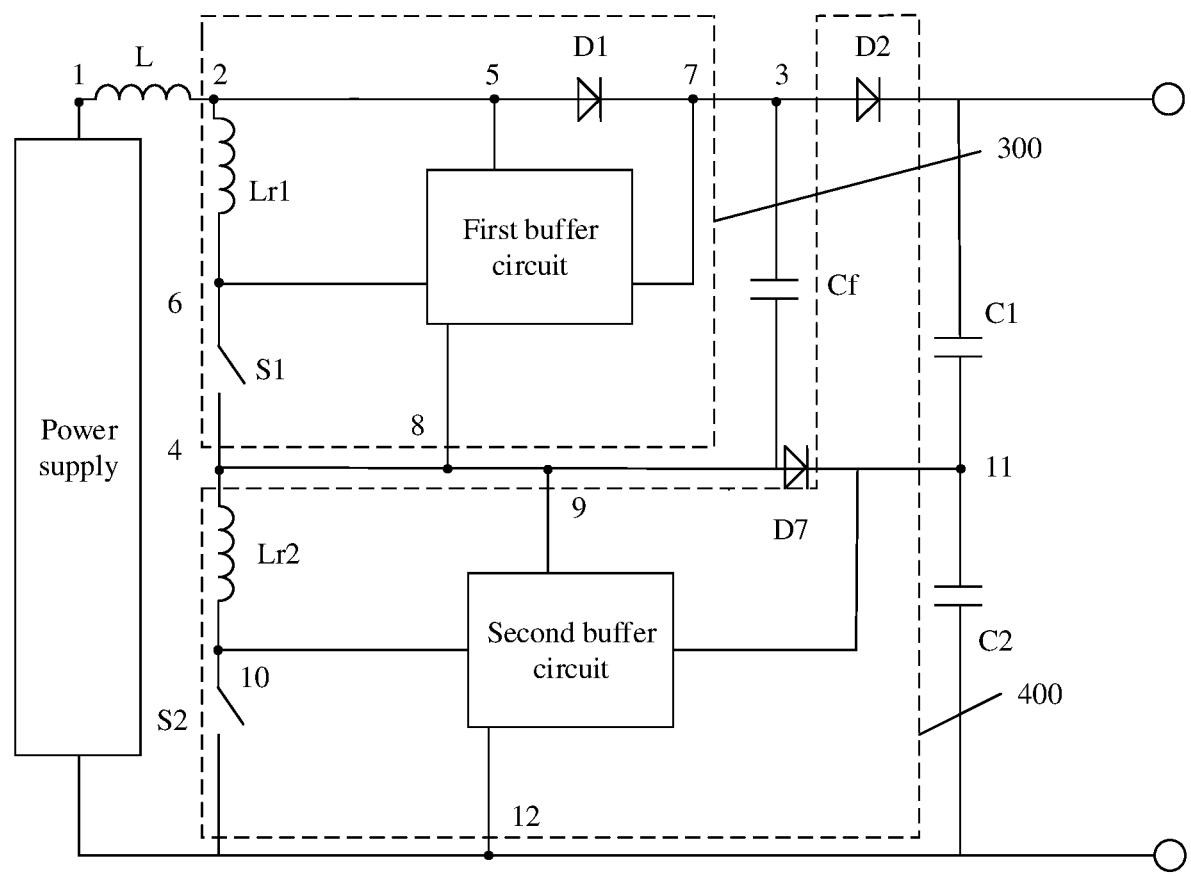
FIG. 22 is a schematic diagram of an eleventh embodiment of a direct current-direct current conversion circuit according to an embodiment of this application.

FIG. 22 is a schematic diagram of an eleventh embodiment of the direct current-direct current conversion circuit according to an embodiment of this application. The direct current-direct current conversion circuit further includes a seventh diode D7.

A positive electrode of the seventh diode D7 is connected to the second terminal 4 of the flying capacitor Cf, and a negative electrode of the seventh diode D7 is connected between the first capacitor C1 and the second capacitor C2.

Same as the foregoing embodiments, in this embodiment, the seventh diode D7 may be disposed to limit a voltage of two terminals of the second switch S2 to below a voltage of two terminals of the second capacitor C2, so that the second switch S2 has no risk of overvoltage. In addition, in a specific scenario, the second diode D2 can be further prevented from being broken down in a circuit power-on process.

An example of preventing the second diode D2 from being broken down in the circuit power-on process is the same as the foregoing embodiments. For details, refer to related descriptions of the direct current-direct current conversion circuit shown in FIG. 10.

It should be understood that, because the energy of the first inductor Lr1 is transferred to the flying capacitor Cf, or to the first capacitor C1 and the second capacitor C2, and the energy of the second inductor Lr2 is transferred only to the second capacitor C2, with an increase of the working time, in the direct current-direct current conversion circuit in this embodiment, the voltage of the first capacitor C1 is not equal to the voltage of the second capacitor C2, and a longer working time indicates a larger difference between the voltages of the first capacitor C1 and the second capacitor C2.

Therefore, in another embodiment of the direct current-direct current conversion circuit, a capacitance balance circuit is added to two terminals of the first capacitor C1 and the second capacitor C2, for balancing voltages of the first capacitor C1 and the second capacitor C2. A first terminal 13 of the capacitance balance circuit is connected to a negative electrode of the second diode D2, a second terminal 14 of the capacitance balance circuit is connected between the first capacitor C1 and the second capacitor C2, and a third terminal 15 of the capacitance balance circuit is connected to the negative electrode of the power supply.

It should be noted that, there may be a plurality of structures of the capacitance balance circuit. The following describes in detail the structures of the capacitance balance circuit by using examples.

Figure 23:
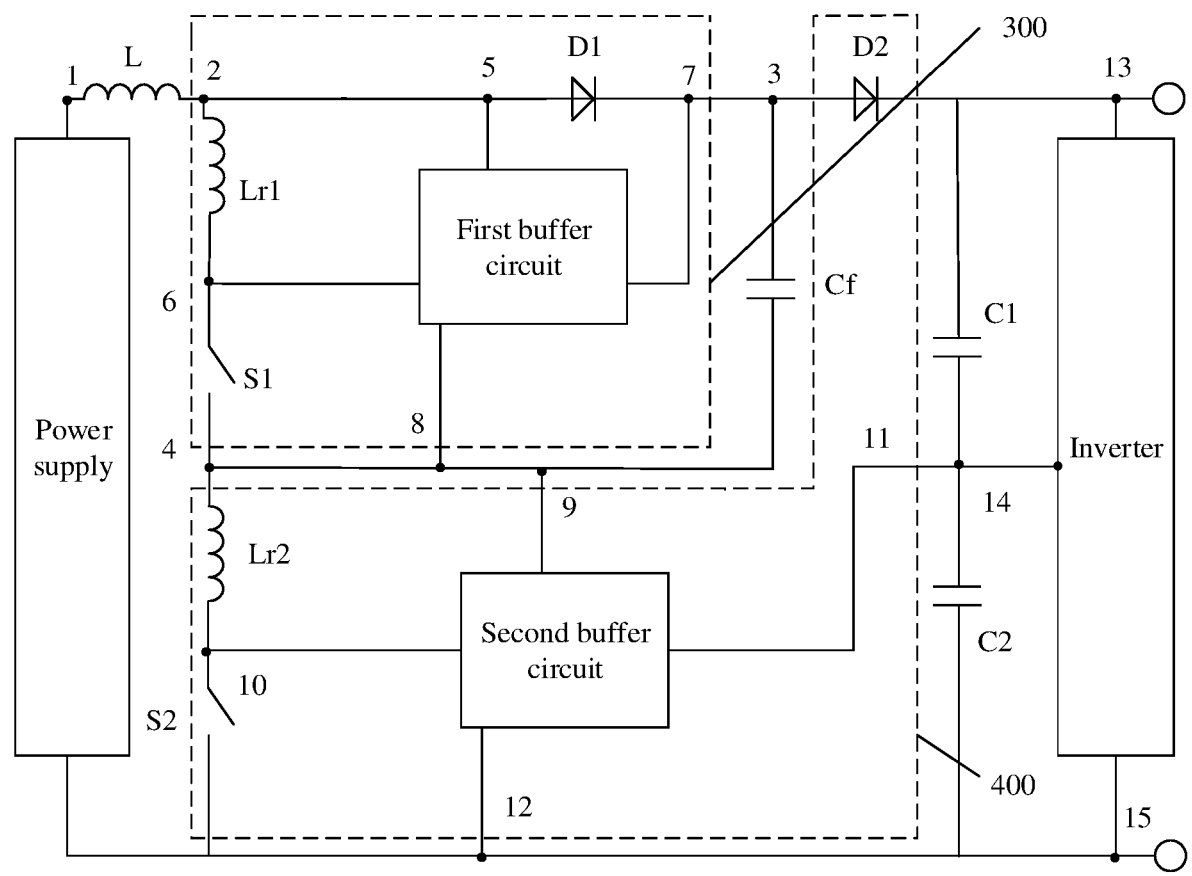
FIG. 23 is a schematic diagram of a twelfth embodiment of a direct current-direct current conversion circuit according to an embodiment of this application.

FIG. 23 is a schematic diagram of a twelfth embodiment of the direct current-direct current conversion circuit according to an embodiment of this application. In this embodiment, the direct current-direct current conversion circuit further includes an inverter.

A positive input terminal of the inverter is connected to a negative electrode of the second diode D2, a bus capacitance midpoint of the inverter is connected to a connection point between the first capacitor C1 and the second capacitor C2, and a negative input terminal of the inverter is connected to the negative electrode of the power supply.

It may be understood that, the inverter itself can balance the voltages of the first capacitor C1 and the second capacitor C2. Therefore, when the output terminal of the direct current-direct current conversion circuit is further connected to the inverter, the inverter is equivalent to the capacitance balance circuit.

In another embodiment of the direct current-direct current conversion circuit, the capacitance balance circuit includes a second branch, a third branch, and a fourth branch.

The second branch includes an eleventh diode D11, a tenth diode D10, a fourth switch S4, and a third switch S3 that are sequentially connected in series, where a negative electrode of the eleventh diode D11 is connected to the negative electrode of the second diode D2, a positive electrode of the eleventh diode D11 is connected to a positive electrode of the tenth diode D10, a first terminal of the third switch S3 is connected to the fourth switch S4, and a second terminal of the third switch S3 is connected to the negative electrode of the power supply.

A first terminal of the third branch is connected between the first capacitor C1 and the second capacitor C2, and a second terminal of the third branch is connected between the tenth diode D10 and the fourth switch S4.

A first terminal of the fourth branch is connected between the tenth diode D10 and the eleventh diode D11, and a second terminal of the fourth branch is connected between the fourth switch S4 and the third switch S3.

A seventh capacitor C7 is connected in series in the fourth branch.

A third inductor Lr3 is connected in series in the fourth branch or the third inductor Lr3 is connected in series in the third branch.

Figure 24:
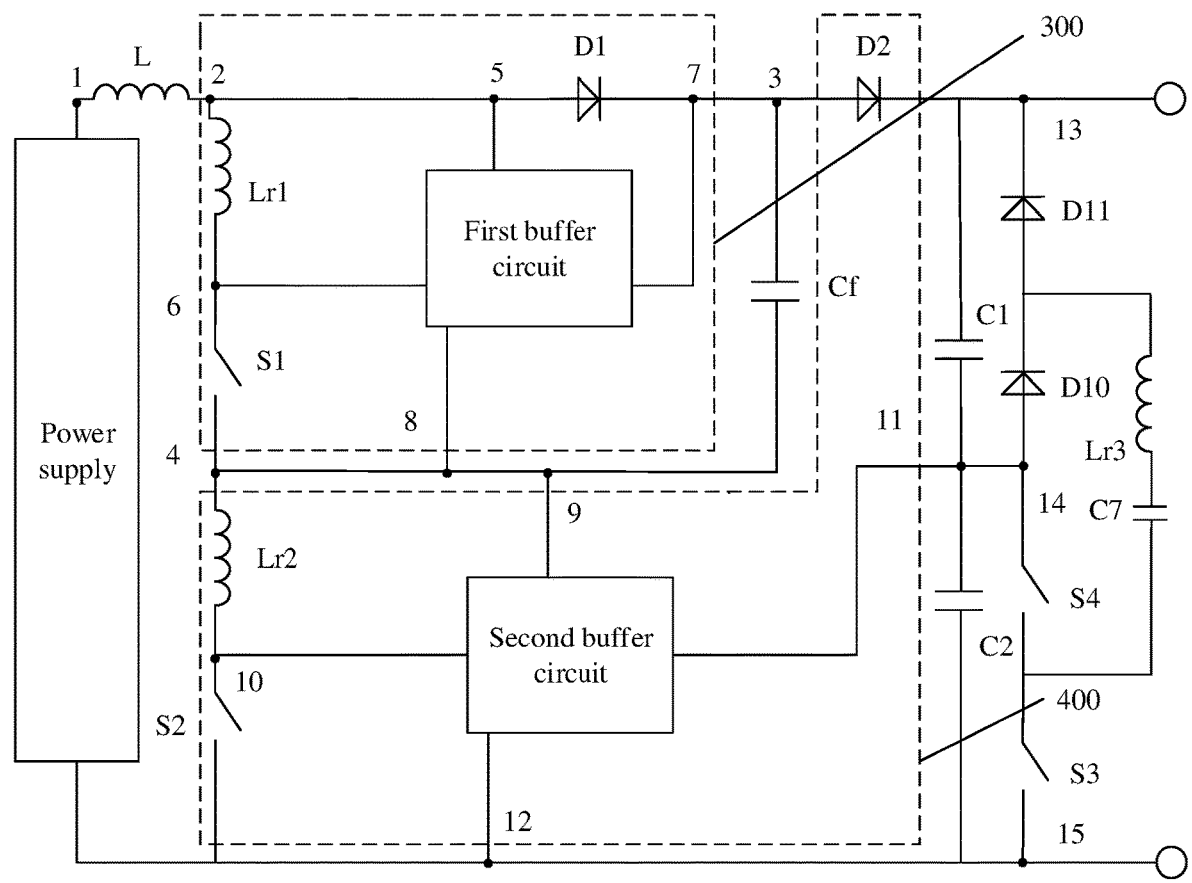
FIG. 24 is a schematic diagram of a thirteenth embodiment of a direct current-direct current conversion circuit according to an embodiment of this application.
Figure 25:
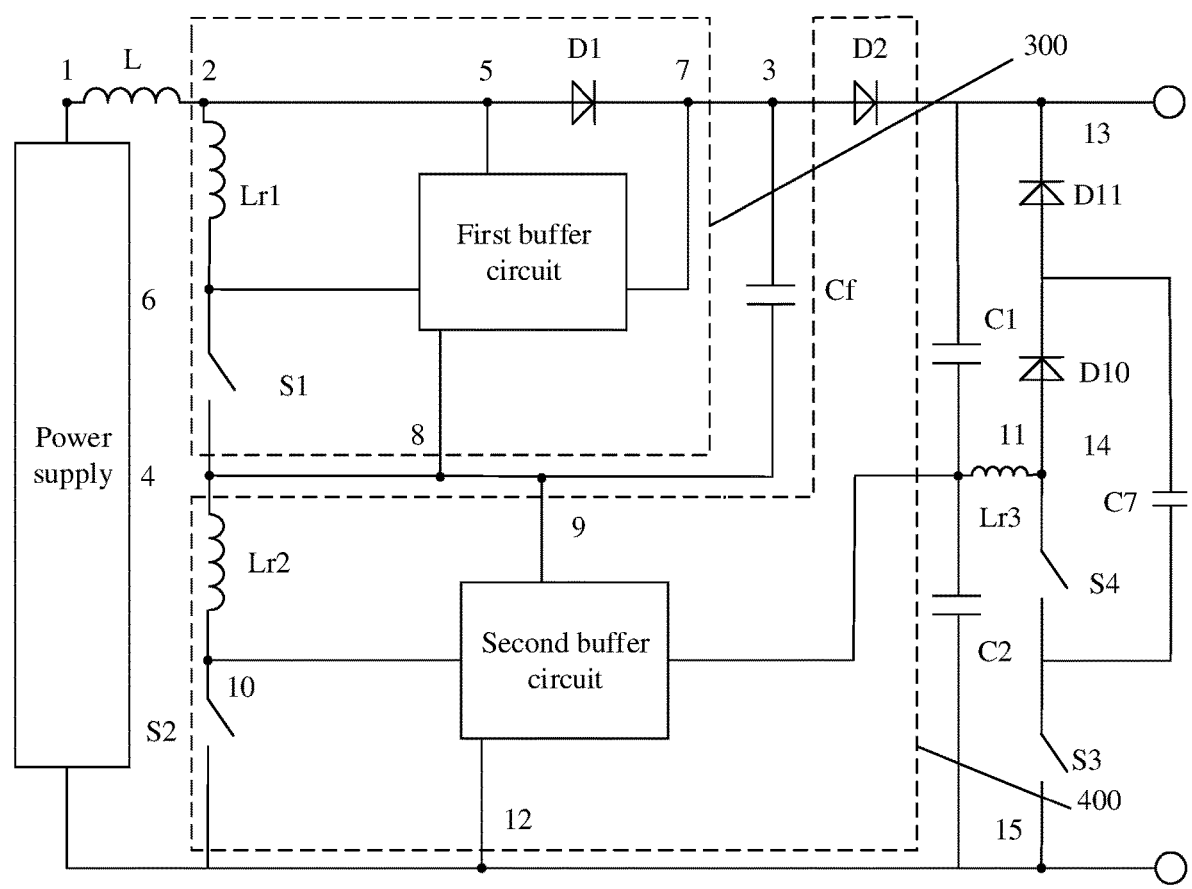
FIG. 25 is a schematic diagram of a fourteenth embodiment of a direct current-direct current conversion circuit according to an embodiment of this application.

When the third inductor Lr3 is connected in series in the fourth branch, the direct current-direct current conversion circuit provided in this embodiment is shown in FIG. 24. FIG. 24 is a schematic diagram of a thirteenth embodiment of a direct current-direct current conversion circuit according to an embodiment of this application. When the third inductor Lr3 is connected in series in the fourth branch, the direct current-direct current conversion circuit provided in this embodiment is shown in FIG. 25. FIG. 25 is a schematic diagram of a fourteenth embodiment of a direct current-direct current conversion circuit according to an embodiment of this application.

It should be noted that, the capacitance balance circuits in FIG. 24 and FIG. 25 are respectively the same as those in FIG. 12 and FIG. 13. Therefore, refer to related descriptions of the capacitance balance circuits shown in FIG. 12 and FIG. 13 in the foregoing embodiments.

In another embodiment of the direct current-direct current conversion circuit, the capacitance balance circuit includes a fifth branch, a sixth branch, and a seventh branch.

The fifth branch includes an eighth switch S8, a seventh switch S7, a sixth switch S6, and a fifth switch S5 that are sequentially connected in series, where a first terminal of the eighth switch S8 is connected to the negative electrode of the second diode D2, a second terminal of the eighth switch S8 is connected to the seventh switch S7, a first terminal of the fifth switch S5 is connected to the sixth switch S6, and a second terminal of the fifth switch S5 is connected to the negative electrode of the power supply.

A first terminal of the sixth branch is connected between the first capacitor C1 and the second capacitor C2, and a second terminal of the sixth branch is connected between the sixth switch S6 and the seventh switch S7.

A first terminal of the seventh branch is connected between the seventh switch S7 and the eighth switch S8, and a second terminal of the seventh branch is connected between the fifth switch S5 and the sixth switch S6.

An eighth capacitor C8 is connected in series in the seventh branch.

A fourth inductor Lr4 is further connected in series in the seventh branch or the fourth inductor Lr4 is connected in series in the third branch.

Figure 26:
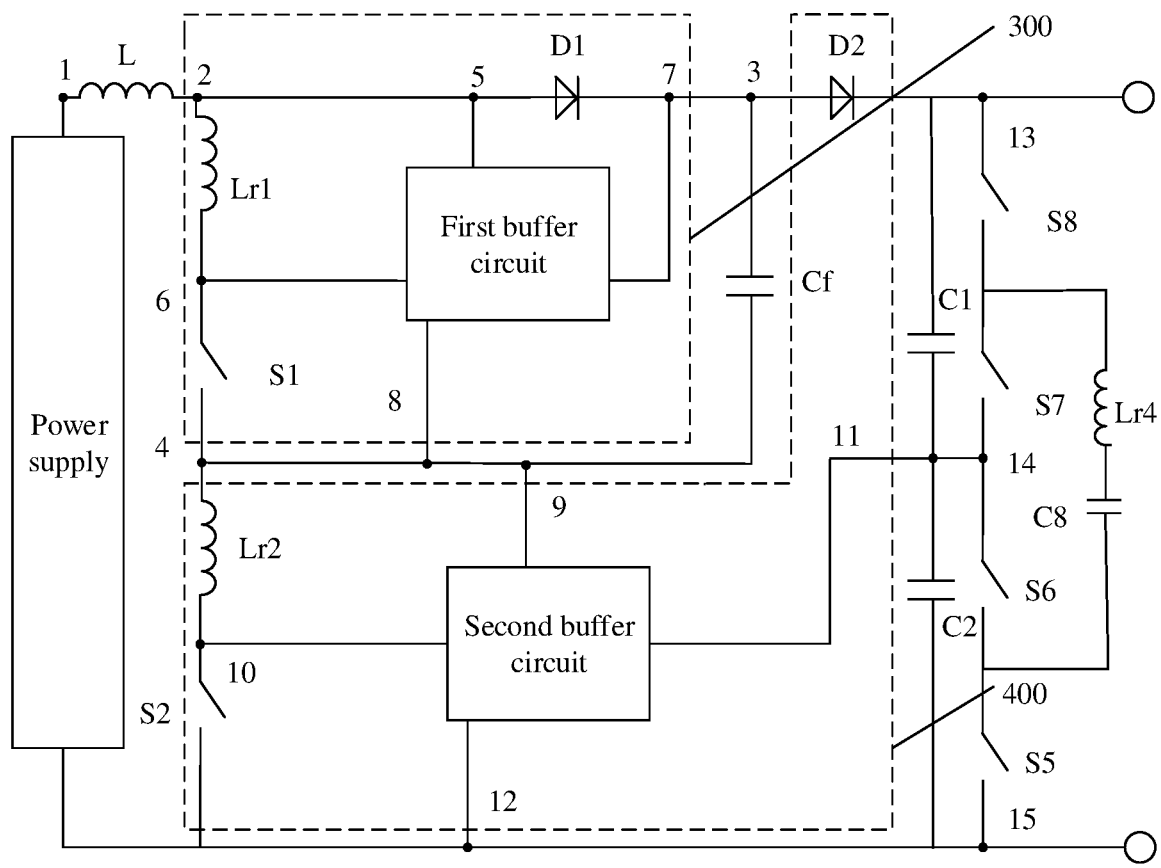
FIG. 26 is a schematic diagram of a fifteenth embodiment of a direct current-direct current conversion circuit according to an embodiment of this application.
Figure 27:
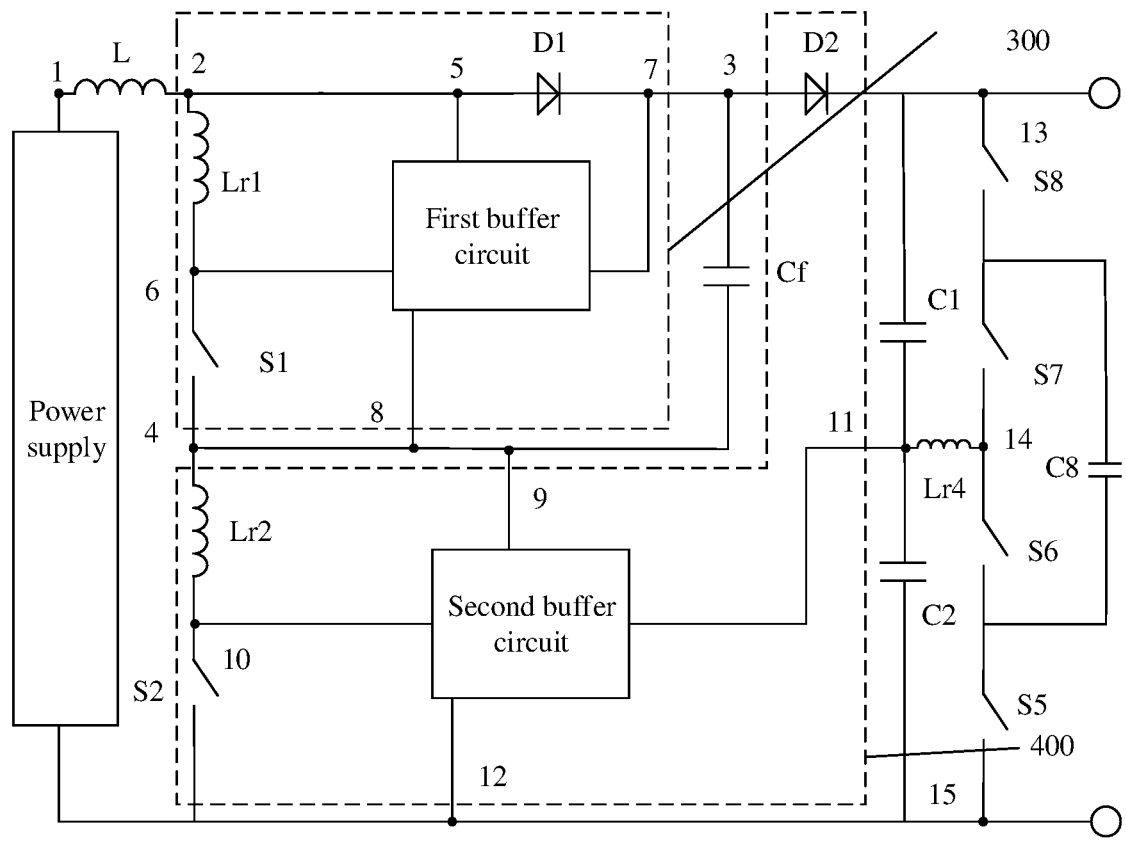
FIG. 27 is a schematic diagram of a sixteenth embodiment of a direct current-direct current conversion circuit according to an embodiment of this application.

When the fourth inductor Lr4 is connected in series in the seventh branch, the direct current-direct current conversion circuit provided in this embodiment is shown in FIG. 26. FIG. 26 is a schematic diagram of a fifteenth embodiment of a direct current-direct current conversion circuit according to an embodiment of this application. When the fourth inductor Lr4 is connected in series in the seventh branch, the direct current-direct current conversion circuit provided in this embodiment is shown in FIG. 27. FIG. 27 is a schematic diagram of a sixteenth embodiment of a direct current-direct current conversion circuit according to an embodiment of this application.

It should be noted that, the capacitance balance circuits in FIG. 26 and FIG. 27 are respectively the same as those in FIG. 14 and FIG. 15. Therefore, refer to related descriptions of the capacitance balance circuits shown in FIG. 14 and FIG. 15 in the foregoing embodiments.

Persons of ordinary skill in the art may understand that all or some of the steps of various circuit operations in the foregoing embodiments may be completed by a program instructing related hardware. The program may be stored in a computer-readable storage medium. The storage medium may include: any medium that can store program code, such as a USB flash drive, a removable hard disk, a read-only memory (ROM), a random access memory (RAM), a magnetic disk, or an optical disc.

The direct current-direct current conversion circuit provided in the embodiments of this application is described in detail above. Specific examples are used in this specification to describe principles and implementations of this application. The descriptions in the foregoing embodiments are merely used to help understand the method and core idea of this application. In addition, persons of ordinary skill in the art may change specific implementations and application scope based on the idea of this application. In conclusion, the content of this specification shall not be construed as a limitation on this application.

What is claimed is:

1. A direct current-direct current conversion circuit, comprising: an input inductor, a first capacitor, a second capacitor, a flying capacitor, a first switch, a second switch, a first inductor, a first diode, a first buffer circuit, a third switch, a fourth switch, a second inductor, a second diode, and a second buffer circuit, wherein a power supply, the input inductor, the first diode, the second diode, the first capacitor, and the second capacitor are sequentially connected in series, wherein a first terminal of the input inductor is connected to a positive electrode of the power supply, a second terminal of the input inductor is connected to a positive electrode of the first diode, and a negative electrode of the first diode is connected to a positive electrode of the second diode;

a first branch and a second branch are connected in parallel between the second terminal of the input inductor and a negative electrode of the power supply, the first branch comprises the first switch and the third switch that are sequentially connected in series, the second branch comprises the first inductor, the second switch, the second inductor, and the fourth switch that are sequentially connected in series, and the first switch and the first inductor are both connected to the second terminal of the input inductor;

a first terminal of the flying capacitor is connected between the first diode and the second diode, a second terminal of the flying capacitor is connected between the first switch and the third switch, and the second terminal of the flying capacitor is further connected between the second switch and the second inductor;

a first terminal of the first buffer circuit is connected to the positive electrode of the first diode, a second terminal of the first buffer circuit is connected between the first inductor and the second switch, and a third terminal of the first buffer circuit is connected to the negative electrode of the first diode;

a first terminal of the second buffer circuit is connected to the second terminal of the flying capacitor, a second terminal of the second buffer circuit is connected between the second inductor and the fourth switch, and a third terminal of the second buffer circuit is connected between the first capacitor and the second capacitor;

the first buffer circuit is configured to transfer energy of the first inductor to the flying capacitor, or to the first capacitor and the second capacitor, when the second switch is disconnected; and the second buffer circuit is configured to transfer energy of the second inductor to the second capacitor when the fourth switch is disconnected.

2. The direct current-direct current conversion circuit according to claim 1, wherein the first buffer circuit comprises a third diode, a fourth diode, and a third capacitor, and wherein a positive electrode of the third diode is the second terminal of the first buffer circuit, a negative electrode of the third diode is connected to a positive electrode of the fourth diode, and a negative electrode of the fourth diode is the third terminal of the first buffer circuit; and a first terminal of the third capacitor is the first terminal of the first buffer circuit, and a second terminal of the third capacitor is connected between the third diode and the fourth diode.

3. The direct current-direct current conversion circuit according to claim 1, wherein the second buffer circuit comprises a fifth diode, a sixth diode, and a fourth capacitor, wherein a positive electrode of the fifth diode is the second terminal of the second buffer circuit, a negative electrode of the fifth diode is connected to a positive electrode of the sixth diode, and a negative electrode of the sixth diode is the third terminal of the second buffer circuit; and a first terminal of the fourth capacitor is the first terminal of the second buffer circuit, and a second terminal of the fourth capacitor is connected between the fifth diode and the sixth diode.

4. The direct current-direct current conversion circuit according to claim 1, further comprising a seventh diode, wherein
a positive electrode of the seventh diode is connected to the second terminal of the flying capacitor, and a negative electrode of the seventh diode is connected between the first capacitor and the second capacitor.

5. The direct current-direct current conversion circuit according to claim 1, further comprising a capacitance balance circuit, wherein
a first terminal of the capacitance balance circuit is connected to a negative electrode of the second diode, a second terminal of the capacitance balance circuit is connected between the first capacitor and the second capacitor, and a third terminal of the capacitance balance circuit is connected to the negative electrode of the power supply; and
the capacitance balance circuit is configured to balance voltages of the first capacitor and the second capacitor.

6. The direct current-direct current conversion circuit according to claim 1, further comprising an inverter, wherein
a positive input terminal of the inverter is connected to a negative electrode of the second diode, a bus capacitance midpoint of the inverter is connected to a connection point between the first capacitor and the second capacitor, and a negative input terminal of the inverter is connected to the negative electrode of the power supply.

7. The direct current-direct current conversion circuit according to claim 5, wherein the capacitance balance circuit comprises a third branch, a fourth branch, and a fifth branch, wherein
the third branch comprises a ninth diode, an eighth diode, a sixth switch, and a fifth switch that are sequentially connected in series, wherein a negative electrode of the ninth diode is connected to the negative electrode of the second diode, a positive electrode of the ninth diode is connected to a negative electrode of the eighth diode, a first terminal of the fifth switch is connected to the sixth switch, and a second terminal of the fifth switch is connected to the negative electrode of the power supply;
a first terminal of the fourth branch is connected between the first capacitor and the second capacitor, and a second terminal of the fourth branch is connected between the eighth diode and the sixth switch;
a first terminal of the fifth branch is connected between the eighth diode and the ninth diode, and a second terminal of the fifth branch is connected between the sixth switch and the fifth switch;
a fifth capacitor is connected in series in the fifth branch; and
a third inductor is connected in series in the fifth branch or the fourth branch.

8. The direct current-direct current conversion circuit according to claim 7, wherein the capacitance balance circuit comprises a sixth branch, a seventh branch, and an eighth branch, wherein
the sixth branch comprises a tenth switch, a ninth switch, an eighth switch, and a seventh switch that are sequentially connected in series, wherein a first terminal of the tenth switch is connected to the negative electrode of the second diode, a second terminal of the tenth switch is connected to the ninth switch, a first terminal of the seventh switch is connected to the eighth switch, and a second terminal of the seventh switch is connected to the negative electrode of the power supply;
a first terminal of the seventh branch is connected between the first capacitor and the second capacitor, and a second terminal of the seventh branch is connected between the eighth switch and the ninth switch;
a first terminal of the eighth branch is connected between the ninth switch and the tenth switch, and a second terminal of the eighth branch is connected between the seventh switch and the eighth switch;
a sixth capacitor is connected in series in the eighth branch; and
a fourth inductor is connected in series in the eighth branch or the fourth branch.

9. A direct current-direct current conversion circuit, comprising: an input inductor, a first capacitor, a second capacitor, a flying capacitor, a first switch, a first inductor, a first diode, a first buffer circuit, a second switch, a second inductor, a second diode, and a second buffer circuit, wherein
a power supply, the input inductor, the first diode, the second diode, the first capacitor, and the second capacitor are sequentially connected in series, wherein a first terminal of the input inductor is connected to a positive electrode of the power supply, a second terminal of the input inductor is connected to a positive electrode of the first diode, and a negative electrode of the first diode is connected to a positive electrode of the second diode;
a first branch is connected in parallel between the second terminal of the input inductor and a negative electrode of the power supply, the first branch comprises the first inductor, the first switch, the second inductor, and the second switch that are sequentially connected in series, and the first inductor is connected to the second terminal of the input inductor;
a first terminal of the flying capacitor is connected between the first diode and the second diode, and a second terminal of the flying capacitor is connected between the first switch and the second inductor;
a first terminal of the first buffer circuit is connected to the positive electrode of the first diode, a second terminal of the first buffer circuit is connected between the first inductor and the first switch, a third terminal of the first buffer circuit is connected to the negative electrode of the first diode, and a fourth terminal of the first buffer circuit is connected to the second terminal of the flying capacitor;
a first terminal of the second buffer circuit is connected to the second terminal of the flying capacitor, a second terminal of the second buffer circuit is connected between the second inductor and the second switch, a third terminal of the second buffer circuit is connected between the first capacitor and the second capacitor, and a fourth terminal of the second buffer circuit is connected to the negative electrode of the power supply;
the first buffer circuit is configured to transfer energy of the first inductor to the first capacitor and the second capacitor when the first switch is in a disconnected state; and
the second buffer circuit is configured to transfer energy of the second inductor to the second capacitor when the second switch is in a disconnected state.

10. The direct current-direct current conversion circuit according to claim 9, wherein the first buffer circuit comprises a third diode, a fourth diode, a fifth diode, a third capacitor, and a fourth capacitor, wherein a positive electrode of the third diode is the second terminal of the first buffer circuit, and a negative electrode of the third diode is connected to a positive electrode of the fourth diode;

a negative electrode of the fourth diode is connected to a positive electrode of the fifth diode, and a negative electrode of the fifth diode is the third terminal of the first buffer circuit;

a first terminal of the third capacitor is the first terminal of the first buffer circuit, and a second terminal of the third capacitor is connected between the fourth diode and the fifth diode; and a first terminal of the fourth capacitor is connected between the third diode and the fourth diode, and a second terminal of the fourth capacitor is the fourth terminal of the first buffer circuit.

11. The direct current-direct current conversion circuit according to claim 9, wherein the second buffer circuit comprises a sixth diode, an eighth diode, a ninth diode, a fifth capacitor, and a sixth capacitor, wherein a positive electrode of the sixth diode is the second terminal of the second buffer circuit, and a negative electrode of the sixth diode is connected to a positive electrode of the eighth diode;

a negative electrode of the eighth diode is connected to a positive electrode of the ninth diode, and a negative electrode of the ninth diode is the third terminal of the second buffer circuit;

a first terminal of the fifth capacitor is the first terminal of the second buffer circuit, and a second terminal of the fifth capacitor is connected between the eighth diode and the ninth diode; and a first terminal of the sixth capacitor is connected between the sixth diode and the eighth diode, and a second terminal of the sixth capacitor is the fourth terminal of the second buffer circuit.

12. The direct current-direct current conversion circuit according to claim 9, further comprising a seventh diode, wherein a positive electrode of the seventh diode is connected to the second terminal of the flying capacitor, and a negative electrode of the seventh diode is connected between the first capacitor and the second capacitor.

13. The direct current-direct current conversion circuit according to claim 9, further comprising a capacitance balance circuit, wherein a first terminal of the capacitance balance circuit is connected to a negative electrode of the second diode, a second terminal of the capacitance balance circuit is connected between the first capacitor and the second capacitor, and a third terminal of the capacitance balance circuit is connected to the negative electrode of the power supply; and the capacitance balance circuit is configured to balance voltages of the first capacitor and the second capacitor.

14. The direct current-direct current conversion circuit according to claim 9, further comprising an inverter, wherein a positive input terminal of the inverter is connected to a negative electrode of the second diode, a bus capacitance midpoint of the inverter is connected to a connection point between the first capacitor and the second capacitor, and a negative input terminal of the inverter is connected to the negative electrode of the power supply.

15. The direct current-direct current conversion circuit according to claim 13, wherein the capacitance balance circuit comprises a second branch, a third branch, and a fourth branch, wherein the second branch comprises an eleventh diode, a tenth diode, a fourth switch, and a third switch that are sequentially connected in series, wherein a negative electrode of the eleventh diode is connected to the negative electrode of the second diode, a positive electrode of the eleventh diode is connected to a positive electrode of the tenth diode, a first terminal of the third switch is connected to the fourth switch, and a second terminal of the third switch is connected to the negative electrode of the power supply;

a first terminal of the third branch is connected between the first capacitor and the second capacitor, and a second terminal of the third branch is connected between the tenth diode and the fourth switch;

a first terminal of the fourth branch is connected between the tenth diode and the eleventh diode, and a second terminal of the fourth branch is connected between the fourth switch and the third switch;

a seventh capacitor is connected in series in the fourth branch; and a third inductor is connected in series in the fourth branch or the third branch.

16. The direct current-direct current conversion circuit according to claim 15, wherein the capacitance balance circuit comprises a fifth branch, a sixth branch, and a seventh branch, wherein the fifth branch comprises an eighth switch, a seventh switch, a sixth switch, and a fifth switch that are sequentially connected in series, wherein a first terminal of the eighth switch is connected to the negative electrode of the second diode, a second terminal of the eighth switch is connected to the seventh switch, a first terminal of the fifth switch is connected to the sixth switch, and a second terminal of the fifth switch is connected to the negative electrode of the power supply;

a first terminal of the sixth branch is connected between the first capacitor and the second capacitor, and a second terminal of the sixth branch is connected between the sixth switch and the seventh switch;

a first terminal of the seventh branch is connected between the seventh switch and the eighth switch, and a second terminal of the seventh branch is connected between the fifth switch and the sixth switch;

an eighth capacitor is connected in series in the seventh branch; and a fourth inductor is connected in series in the seventh branch or the third branch.

\* \* \* \* \*

UNITED STATES PATENT AND TRADEMARK OFFICE
CERTIFICATE OF CORRECTION

PATENT NO. : 11,894,762 B2
APPLICATION NO. : 17/670592
DATED : February 6, 2024
INVENTOR(S) : Jun Wang et al.

It is certified that error appears in the above-identified patent and that said Letters Patent is hereby corrected as shown below:

In the Specification

Column 15, Line 12, Change "DE" to --D1.--;

Column 16, Line 48, Change "DE" to --D1.--;

Column 25, Line 26, Change "DE" to --D1.--; and

Column 26, Line 65, Change "DE" to --D1.--.

Signed and Sealed this
Fourteenth Day of May, 2024

Katherine Kelly Vidal
*Director of the United States Patent and Trademark Office*